(12) United States Patent
Tamura

(10) Patent No.: US 8,300,978 B2
(45) Date of Patent: Oct. 30, 2012

(54) PROJECTOR, ELECTRONIC APPARATUS, AND METHOD OF CONTROLLING PROJECTOR

(75) Inventor: Akihiko Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 593 days.

(21) Appl. No.: 12/405,608

(22) Filed: Mar. 17, 2009

(65) Prior Publication Data

US 2009/0238490 A1    Sep. 24, 2009

(30) Foreign Application Priority Data

Mar. 18, 2008    (JP) .................................. 2008-068960

(51) Int. Cl.
*G06K 9/40*    (2006.01)
(52) U.S. Cl. ......... 382/275; 382/295; 348/744; 348/806
(58) Field of Classification Search .................. 382/275, 382/295; 348/744, 806
See application file for complete search history.

(56) References Cited

U.S. PATENT DOCUMENTS

| | | | | |
|---|---|---|---|---|
| 5,465,121 A | * | 11/1995 | Blalock et al. | 348/744 |
| 6,367,933 B1 | * | 4/2002 | Chen et al. | 353/69 |
| 6,449,004 B1 | * | 9/2002 | Okisu et al. | 348/44 |
| 6,806,903 B1 | * | 10/2004 | Okisu et al. | 348/254 |
| 6,940,529 B2 | * | 9/2005 | Deering | 345/647 |
| 7,003,172 B2 | * | 2/2006 | Takeuchi et al. | 382/254 |
| 7,475,995 B2 | * | 1/2009 | Matsumoto et al. | 353/69 |
| 7,705,862 B1 | * | 4/2010 | Teng | 345/647 |
| 2003/0058368 A1 | * | 3/2003 | Champion | 348/581 |
| 2004/0109615 A1 | * | 6/2004 | Nakamura | 382/317 |
| 2004/0239888 A1 | * | 12/2004 | Kobayashi | 353/69 |
| 2005/0024508 A1 | * | 2/2005 | Okisu et al. | 348/254 |
| 2005/0078879 A1 | * | 4/2005 | Sakurai et al. | 382/275 |
| 2005/0162620 A1 | * | 7/2005 | Taguchi et al. | 353/69 |
| 2005/0163396 A1 | * | 7/2005 | Morichika et al. | 382/275 |
| 2006/0280376 A1 | * | 12/2006 | Lei | 382/275 |

FOREIGN PATENT DOCUMENTS

| | | | |
|---|---|---|---|
| JP | 2007150531 | * | 6/2007 |
| JP | A-2007-150531 | | 6/2007 |

* cited by examiner

*Primary Examiner* — Jayesh A Patel
(74) *Attorney, Agent, or Firm* — Oliff & Berridge, PLC

(57) ABSTRACT

A projector adapted to correct a keystone distortion of an image, includes a frame memory adapted to store a pre-correction image, a block data storage memory adapted to store the pre-correction image by block data that composed of M pixels in a first direction and N pixels in a second direction (M, N≧2), a correction section adapted to correct the pre-correction image based on the block data stored in the block data storage memory, and a control section adapted to perform control of obtaining the pre-correction image from the frame memory by the block data, and storing the obtained pre-correction image in the block data storage memory, and the control section obtains contiguous n×N (n≧2) lines of the image from the frame memory and stores the obtained image in the block data storage memory at the beginning of the correction process.

6 Claims, 22 Drawing Sheets

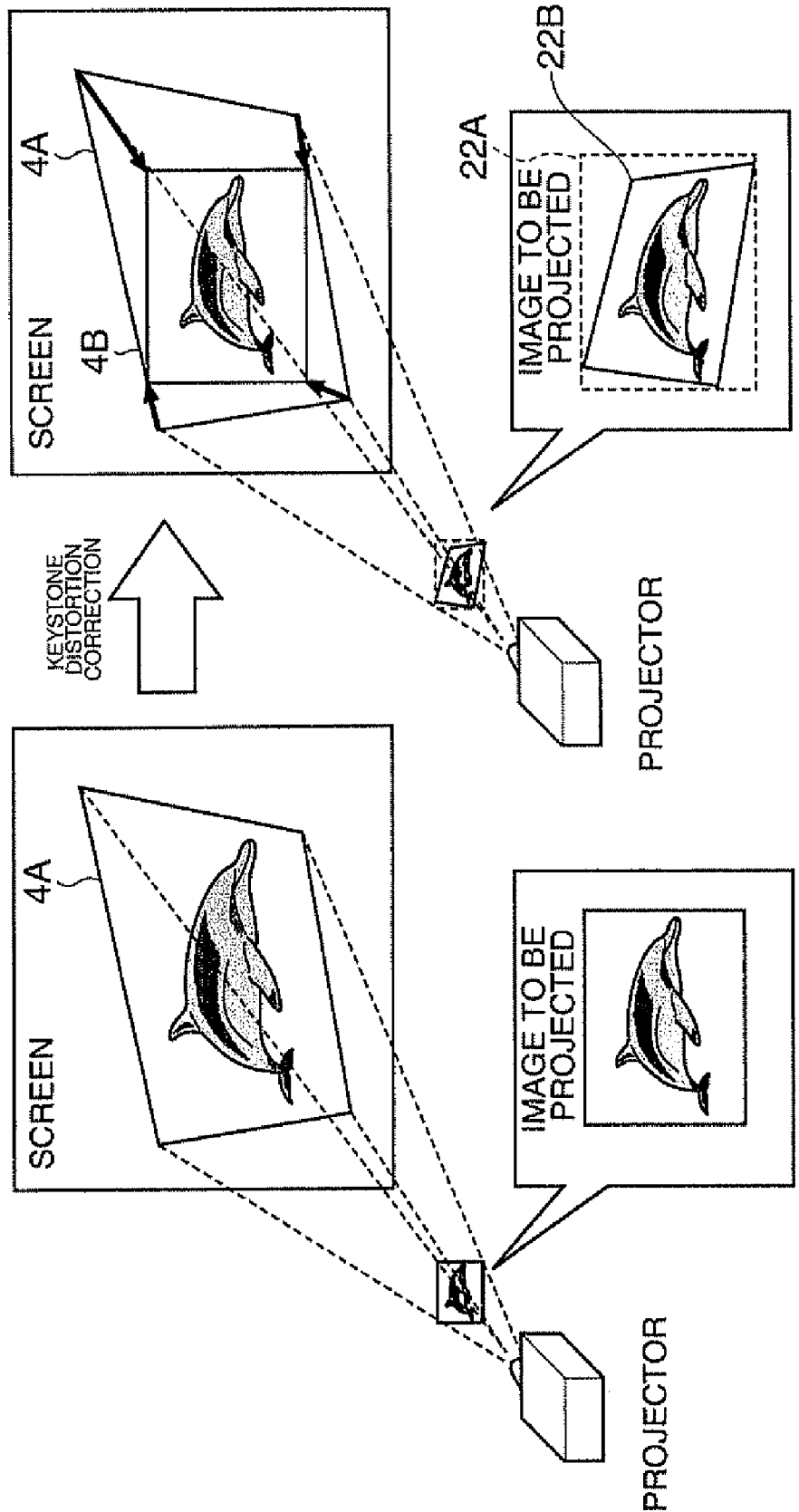

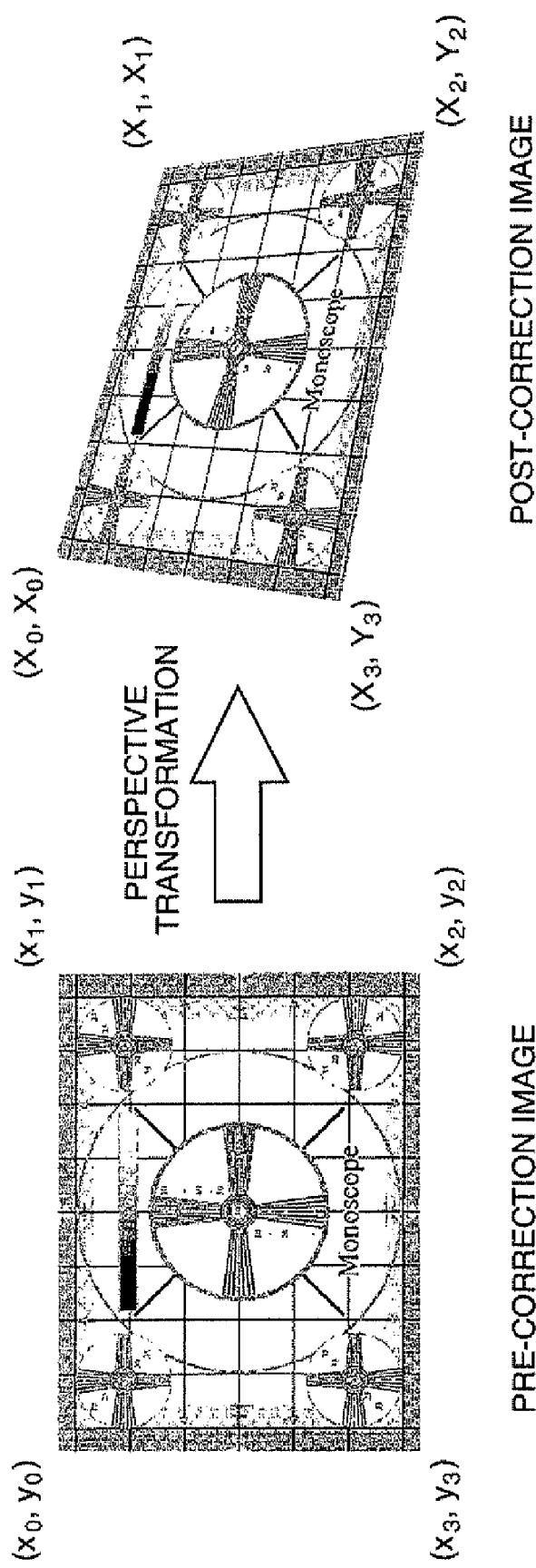

POST-CORRECTION IMAGE

PRE-CORRECTION IMAGE

| 0,0 | 1,0 | 2,0 | 3,0 | 4,0 | 5,0 | | 126,0 | 127,0 |
|-----|-----|-----|-----|-----|-----|---|-------|-------|
| 0,1 | 1,1 | 2,1 | 3,1 | 4,1 | 5,1 | ... | 126,1 | 127,1 |
| 0,2 | 1,2 | 2,2 | 3,2 | 4,2 | 5,2 | | 126,2 | 127,2 |
| 0,3 | 1,3 | 2,3 | 3,3 | 4,3 | 5,3 | | 126,3 | 127,3 |

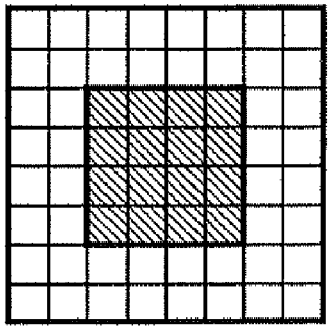
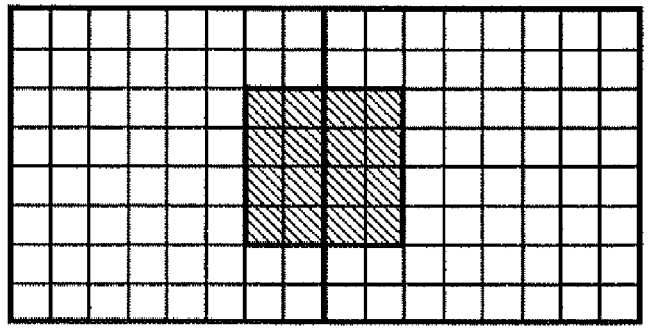
FIG. 19A
FIG. 19B
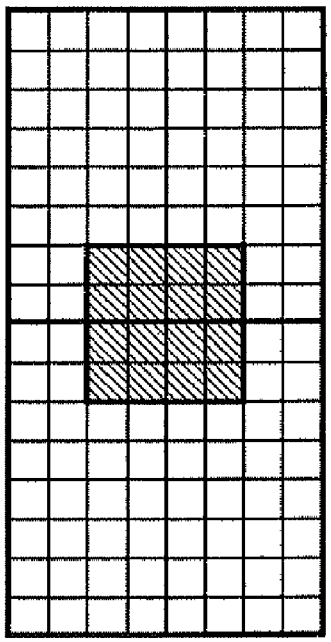
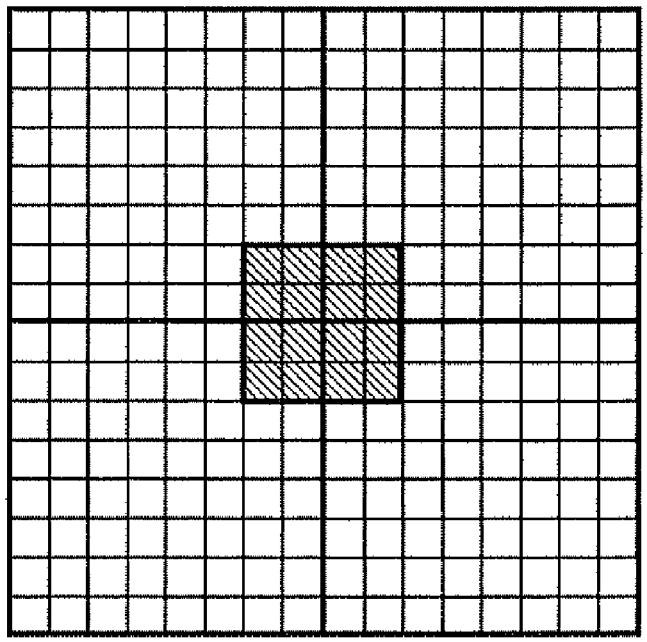
FIG. 19C
FIG. 19D

FIG. 22

PROJECTOR, ELECTRONIC APPARATUS, AND METHOD OF CONTROLLING PROJECTOR

BACKGROUND

1. Technical Field

The present invention relates to a projector adapted to project an image on a projection surface, an electronic apparatus equipped with the projector, and a method of controlling the projector.

2. Related Art

In the case of projecting a still image or a moving image on a screen with a projector such as a projection display device, the image is distorted to have a trapezoidal shape unless a light source of the projector and the projection surface of the screen perpendicularly face to each other. In the past, a projector correcting the trapezoidal distortion (so-called keystone distortion) of the image has been known (see e.g., JP-A-2007-150531 (Document 1)).

Incidentally, the keystone distortion correction is performed by, for example, deforming a substantially rectangle image displayed on a light modulation section such as an LCD so that an image projected on a projection surface becomes to have a rectangle shape. Although it is necessary to read out the image to be corrected, which is stored in a memory, in accordance with the arrangement of the lines of the corrected image when executing such a keystone distortion correction, since the angles of the lines of the image to be corrected and the corrected image do not necessarily match with each other, when reading out the image to be corrected and stored in the memory, the read addresses are not consecutive to each other in most cases. In the Document 1, there is provided a table for reading out, and the image to be corrected is read out from the memory based on the table. Therefore, in the Document 1, there arises a problem of requiring an extra memory for storing the table.

SUMMARY

The invention has an advantage of correcting the keystone distortion with a simple configuration in a projector adapted to project an image.

In view of the problems described above, a first aspect of the invention is directed to a projector adapted to correct a keystone distortion of an image, and to display a post-correction image, including a frame memory adapted to store a pre-correction image, a block data storage memory adapted to store the pre-correction image by block data that composed of M pixels in a first direction and N pixels in a second direction (M, N≧2) and provided with a capacity capable of storing an image corresponding to n×N (n≧2) lines of the image, a correction section adapted to correct the pre-correction image based on the block data stored in the block data storage memory, and a control section adapted to perform control of obtaining the pre-correction image from the frame memory by the block data, and storing the obtained pre-correction image in the block data storage memory, and the control section obtains contiguous n×N (n≧2) lines of the image from the frame memory and stores the obtained image in the block data storage memory at the beginning of the correction process, and in the subsequent process, if the block data to be the object of the processing is absent in the block data storage memory, obtains the block data from the frame memory, and overwrites block data which is farthest from obtained block data in the second direction in the pre-correction image with the obtained block data.

According to the configuration described above, the pre-correction image is stored in the frame memory, the block data is stored in a block data storage memory adapted to store the pre-correction image by block data composed of M pixels in a first direction and N pixels in a second direction (M, N≧2), and provided with a capacity capable of storing n×N (n≧2) lines of the pre-correction image, a correction section corrects the pre-correction image based on the block data stored in the block data storage memory, and if the block data the correction section takes as the object of the processing is absent from the block data storage memory, the control section performs control of obtaining the pre-correction image from the frame memory in units of the block data, and storing the obtained pre-correction data in the block data storage memory, and the control section obtains the image corresponding to contiguous n×N (n≧2) lines from the frame memory and stores the obtained image in the block data storage memory at the beginning of the correction process, and in the subsequent process, if the block data to be the object of the processing is absent in the block data storage memory, obtains the block data from the frame memory, and overwrites block data which is farthest from obtained block data in the second direction in the pre-correction image with the obtained block data. Therefore, it becomes possible to correct the keystone distortion with a simple configuration.

A second aspect of the invention is directed to the projector of the first aspect of the invention, wherein the pre-correction image stored in the frame memory is converted in format so that the pixels forming the block data are stored in contiguous addresses.

According to the configuration described above, it is possible to read out the pre-correction image from the frame memory in serial order. Therefore, since the read out of the pre-correction image from the frame memory can be performed at a high rate, the keystone distortion correction can be executed at a high speed.

A third aspect of the invention is directed to the projector of one of the first and the second aspects of the invention, wherein the block data storage memory stores the pixels forming the block data in different banks.

According to the configuration described above, the block data can be read out by switching the banks. Therefore, since the block data can be read out at a high rate by the switching of the banks, which can be executed at a higher rate than the switching of the addresses, the keystone distortion correction can be executed at a high speed.

A fourth aspect of the invention is directed to the projector of one of the first and the second aspects of the invention, wherein an output section adapted to store a predetermined amount of the post-correction image corrected by the correction section, and then output in a lump is further provided.

According to the configuration described above, the post-correction image can be output in a lump after storing a predetermined amount of the post-correction image. Therefore, by executing the block transfer of the post-correction image, the post-correction image can be output at a high rate.

A fifth aspect of the invention is directed to an electronic apparatus equipped with the projector of any one of the first through the fourth aspects of the invention.

According to the configuration described above, it is possible to provide an electronic apparatus capable of correcting the keystone distortion with a simple configuration.

A sixth aspect of the invention is directed to a method of controlling a projector adapted to correct a keystone distortion of an image, and to display a post-correction image, the method including the step of storing a pre-correction image in a frame memory, the step of obtaining contiguous n×N (n≧2)

lines of the pre-correction image from the frame memory by a block data that composed of M pixels in a first direction and N pixels in a second direction (M, N≧2), the step of storing the obtained image in a block data storage memory at the beginning of the correction process, the step of correcting the pre-correction image based on the block data stored in the block data storage memory, and the step of obtaining, the block data from the frame memory if the block data to be the object of the processing is absent from the block data storage memory, and overwriting block data which is farthest from obtained block data in the second direction in the pre-correction image with the obtained block data.

According to the configuration described above, the pre-correction image is stored in the frame memory, the block data is stored in a block data storage memory adapted to store the pre-correction image by block data that composed of M pixels in a first direction and N pixels in a second direction (M, N≧2), and provided with a capacity capable of storing n×N (n≧2) lines of the pre-correction image, a correction section corrects the pre-correction image based on the block data stored in the block data storage memory, and if the block data the correction section takes as the object of the processing is absent from the block data storage memory, the control section perform control of obtaining the pre-correction image from the frame memory in units of the block data, and storing the obtained pre-correction data in the block data storage memory, the control section obtains the image corresponding to contiguous n×N (n≧2) lines from the frame memory and stores the obtained image in the block data storage memory at the beginning of the correction process, and in the subsequent process, if the block data to be the object of the processing is absent from the block data storage memory, the control section obtains the block data from the frame memory, and overwriting block data which is farthest from obtained block data in the second direction in the pre-correction image with the obtained block data. Therefore, it becomes possible to correct the keystone distortion with a simple configuration.

BRIEF DESCRIPTION OF THE DRAWINGS

The invention will now be described with reference to the accompanying drawings, wherein like numbers reference like elements.

FIG. 7 is a diagram showing an example of correspondence between the display condition of the liquid crystal panel and a projection image.

FIG. 8 is a diagram showing perspective transformation.

FIG. 12 is a diagram for explaining an initial block.

FIG. 14 is a diagram showing a cache state in the case in which a correction process makes progress.

FIGS. 19A through 19D are diagrams showing a relationship between the cache block and the interpolation pixel block.

FIG. 22 is a diagram for explaining banks of an SRAM.

DESCRIPTION OF EXEMPLARY EMBODIMENTS

A. Explanation of an Embodiment of the Invention

An embodiment applying the invention will hereinafter be explained with reference to the accompanying drawings.

Figure 1:
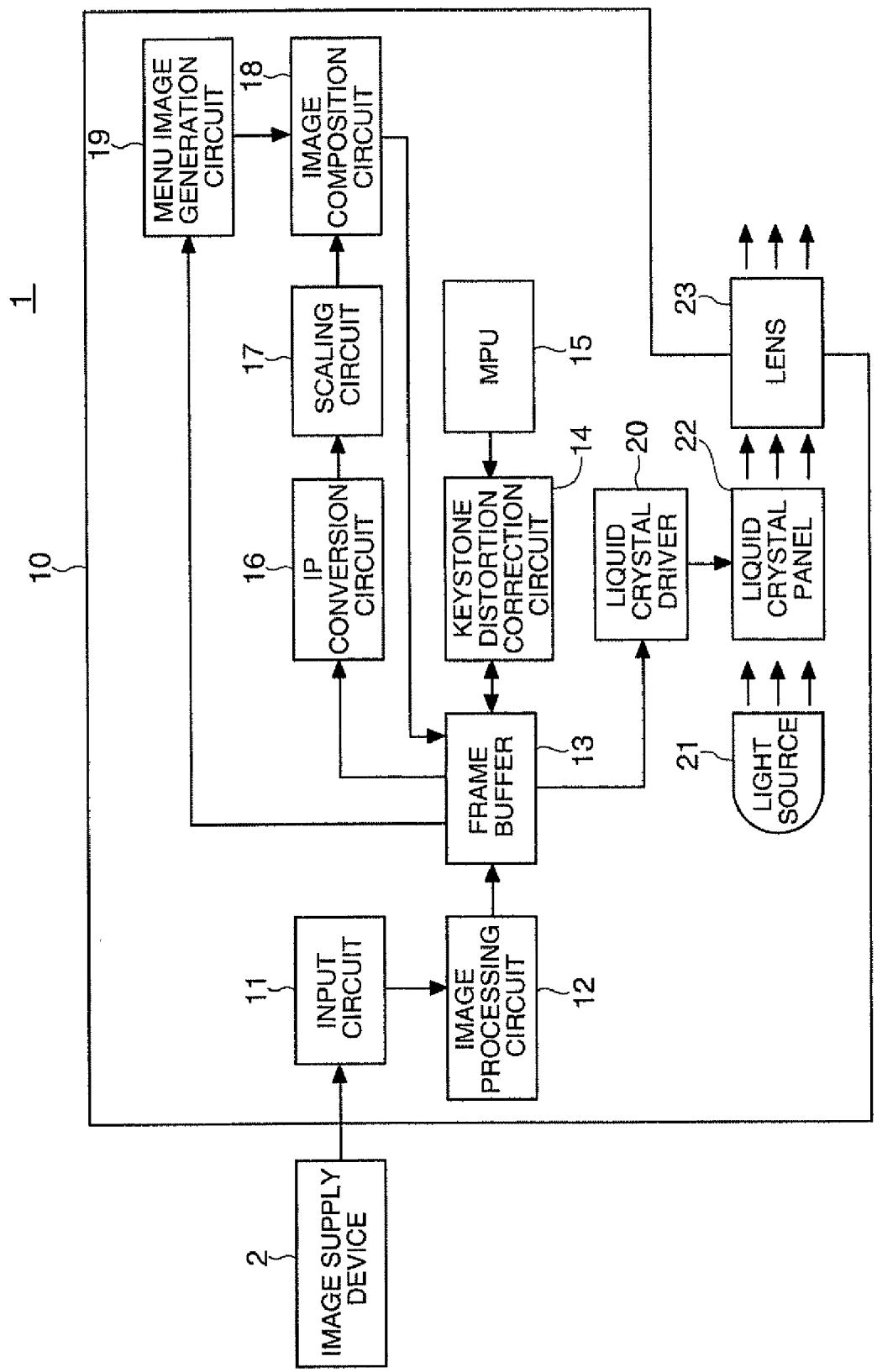
FIG. 1 is a block diagram showing a configuration of a projector system according to an embodiment.

FIG. 1 is a block diagram showing a schematic configuration of a projector system 1 according to the present embodiment.

The projector system 1 is configured including an image supply device 2 for outputting an image signal, and a projector 10 for projecting an image based on the image signal output from the image supply device 2. The image projected by the projector system 1 can be a still image or a moving image, and the image in the following explanations can include both of the still image and the moving image.

The projector 10 is provided with a micro processing unit (MPU) 15 for controlling each section of the projector 10, and the MPU 15 reads out a control program stored in a storage section, not shown, to execute the control program, thereby realizing various functions of the projector 10. Here, although the MPU 15 forms the projector 10 itself, it is possible to consider that the MPU 15 functions as a control device of the projector 10.

The projector 10 has an input circuit 11, an image processing circuit 12, a frame buffer 13 (corresponding to a "frame memory" in the appended claims), a keystone distortion correction circuit 14, an interlace/progressive (IP) conversion circuit 16, a scaling circuit 17, an image composition circuit 18, a menu image generation circuit 19, a liquid crystal driver 20, a light source 21, a liquid crystal panel 22, and a lens 23.

Here, the input circuit 11 is a circuit for inputting an image signal such as a composite signal, a component signal, or an RGB signal from the image supply device 2 such as a Digital Versatile Disk (DVD) player, a video cassette recorder, or a personal computer. If a sync signal is included in an image signal thus input, the input circuit 11 separates the sync signal such as a vertical sync signal or a horizontal sync signal from the image signal. Further, the input circuit 11 converts the analog image signal from which the sync signal is separated into a digital image signal.

The image processing circuit 12 writes the digital image signal, which is supplied from the input circuit 11, into the frame buffer 13 every frame as the image data. Further, the image processing circuit 12 executes various color corrections such as an adjustment of the luminance or the chromaticness on the image data in accordance with instructions or the like from the user.

The frame buffer 13 is composed, for example, of a Double-Data-Rate Synchronous Dynamic Random Access Memory (DDR-SDRAM), and stores the original image data output from the image processing circuit 12, the pre-correction image data obtained by the image composition circuit 18 executing the format conversion on the original image data, and the post-correction image data obtained by the keystone distortion correction circuit 14 executing the keystone distortion correction on the pre-correction image data. Further, a working area used when the keystone distortion correction circuit 14 operates is prepared in the frame buffer 13.

The keystone distortion correction circuit 14 corrects the distortion (hereinafter referred to as a keystone distortion) caused when performing projection in the condition in which the projector 10 is tilted with respect to the screen. Specifically, in order for displaying the pre-correction image data, which is stored in the frame buffer 13, on the liquid crystal panel 22 with a shape for compensating the keystone distortion, the keystone distortion correction circuit 14 executes the correction process on the pre-correction image data, and stores it in the frame buffer 13 as the post-correction image data. It should be noted that the details of the keystone distortion and the keystone distortion correction will be described later.

The IP conversion circuit 16 executes a process for converting the format of the original image data stored in the frame buffer 13 from the interlace format to the progressive format, and supplies the scaling circuit 17 with the image data thus obtained. The scaling circuit 17 executes an enlarging process or a reducing process of the size on the original image data on which the IP conversion circuit 16 has executed the conversion of the format, and supplies the image composition circuit 18 with the image data thus obtained.

The image composition circuit 18 combines the menu image generated by the menu image generation circuit 19 and the original image data supplied from the scaling circuit 17 with each other, and at the same time executes the format conversion regarding the arrangement of the data on the original image data, and then writes the results in the frame buffer 13 as the pre-correction image data. It should be noted that the format conversion denotes a process for converting the storage type (format) of the image data so that the keystone distortion correction circuit 14 can obtain the pre-correction image data stored in the frame buffer 13 with a smaller number of times of access to the frame buffer 13 when the keystone distortion correction circuit 14 executes the keystone distortion correction.

The menu image generation circuit 19 generates and then outputs characters and symbols representing the operation state of the projector 10 or an image used when performing the image quality adjustment and so on.

The liquid crystal driver 20 drives the liquid crystal panel 22 based on the post-correction image data stored in the frame buffer 13 to display the image.

The light source 21 is configured including, for example, a lamp such as a high-pressure mercury lamp, ultra-high-pressure mercury lamp, or another light emitter.

The liquid crystal panel 22 is formed of a transmissive liquid crystal panel having a plurality of pixels arranged in a matrix. The liquid crystal panel 22 is driven by the liquid crystal driver 20, and varies the light transmission in each of the pixels thus arranged in a matrix, thereby forming an image.

Here, in the case in which the projector 10 is configured as a tri-LCD projector, there are disposed three liquid crystal panels 22 corresponding respectively to three colors of R, G, and B, a prism for distributing and collecting the light from the light source 21, and so on. In the description of the present embodiment, for the sake of convenience of understanding, a configuration provided with one liquid crystal panel 22 will be explained only as nothing more than one example.

The lens 23 is composed mainly of a combination of lens groups including one or more lenses, and has a configuration capable of executing focus adjustment when the focus control section, not shown, drives the lens 23. Further, the lens 23 has a configuration capable of zooming or reducing the image formed by the light transmitted through the liquid crystal panel 22 when the zoom control section, not shown, drives the lens 23.

It should be noted that although it is also possible that the optical system of the projector 10 has a configuration including a lens array for adjusting the light distribution, a polarization adjustment element for adjusting the polarization, a mirror, a prism, a dust-proof glass, and so on besides the light source 21, the liquid crystal panel 22, and the lens 23, illustrations and explanations therefor will be omitted here.

Figure 2:
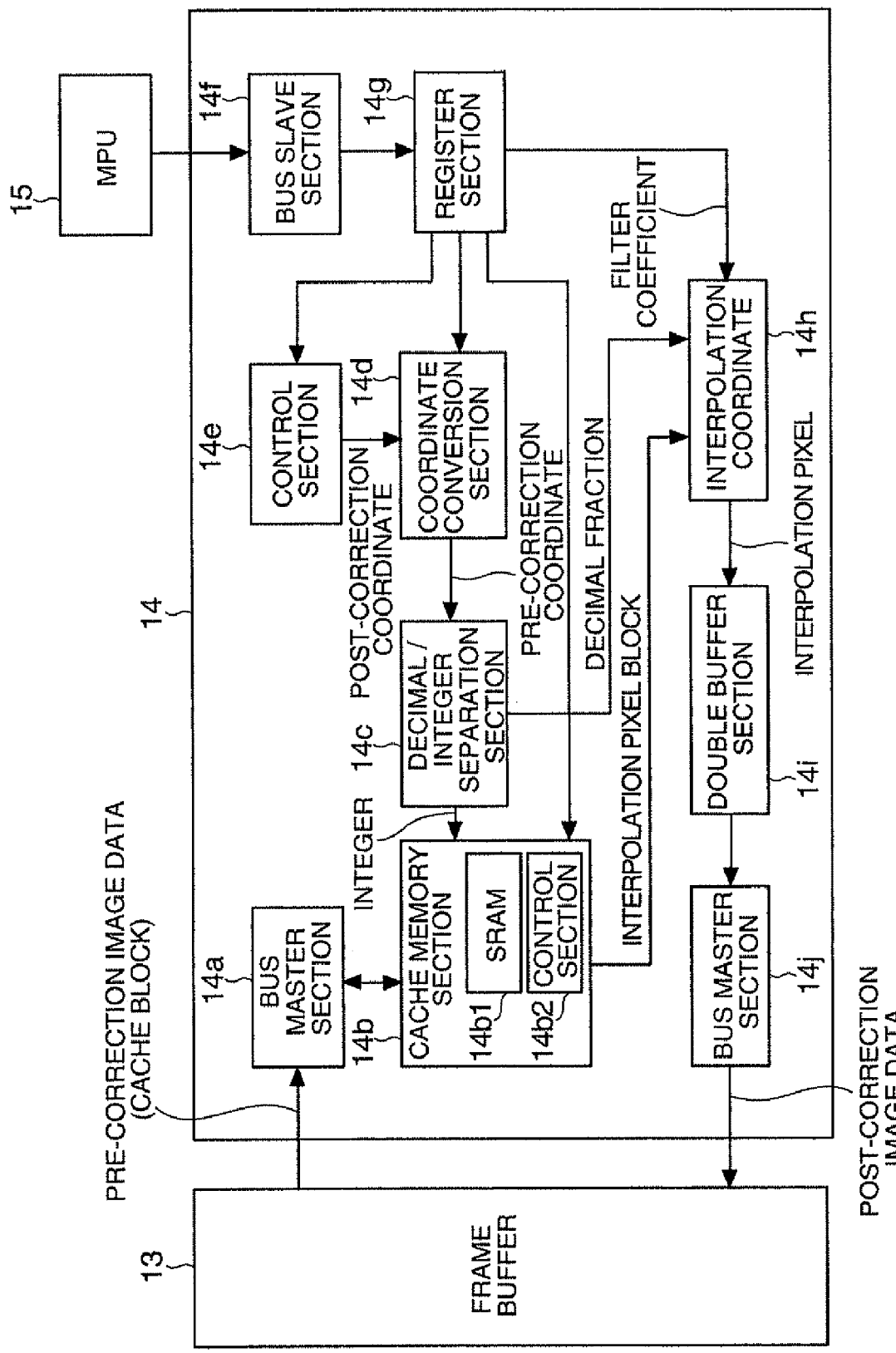
FIG. 2 is a block diagram showing a detailed configuration example of a keystone distortion correction circuit shown in FIG. 1.

FIG. 2 is a block diagram showing a detailed configuration example of the keystone distortion correction circuit 14 shown in FIG. 1. As shown in FIG. 2, the keystone distortion correction circuit 14 has a bus master section 14a, a cache memory section 14b, a decimal/integer separation section 14c, a coordinate conversion section 14d, a control section 14e, a bus slave section 14f, a register section 14g, a pixel interpolation section 14h (corresponding to a "correction section" in the appended claims), a double buffer section 14i (corresponding to an "output section" in the appended claims), and a bus master section 14j.

Here, the bus master section 14a performs access control related to buses (an address bus and a data bus) to the frame buffer 13 when obtaining the pre-correction image data stored in the frame buffer 13.

The cache memory section 14b has a static RAM (SRAM) 14b1 (corresponding to a "block data storage memory" in the appended claims) with a higher access rate and a control section 14b2 (corresponding to a "control section" in the appended claims) for controlling the SRAM 14b1, and obtains and then stores a part of the pre-correction image data in units of a cache block composed of 8×8 pixels. Further, the cache memory section 14b supplies the pixel interpolation section 14h with an interpolation pixel block composed of 4×4 pixels designated by the integer component of a pre-correction coordinate supplied from the decimal/integer separation section 14c.

The control section 14e controls each section of the keystone distortion correction circuit 14 based on a program stored in the storage section, not shown, to execute the keystone distortion correction process. In more detail, the control section 14e calculates post-correction coordinates as the coordinates of the image on which the keystone distortion correction has been executed, based on various parameters stored in the register section 14g, and sequentially outputs the results to the coordinate conversion section 14d.

The register section 14g stores a parameter supplied from the MPU 15. Specifically, the register section 14g stores commands (e.g., start and stop commands) related to the keystone distortion correction, information representing the status of the process, information (e.g., the resolution of the image) related to the input image, the storage address (the storage address in the frame buffer 13) of the pre-correction image, the pre-correction coordinates ($x_0$ through $x_3$, $y_0$ through $y_3$) (see FIG. 8), the storage address (the storage address in the frame buffer 13) of the post-correction image, the post-correction coordinates ($X_0$ through $X_3$, $Y_0$ through $Y_3$) (see FIG. 8), conversion coefficients (described later in detail) of a coordinate conversion matrix, an interpolation filter coefficient (a filter coefficient of the pixel interpolation section 14h), and information related to a background color (e.g., blue).

The coordinate conversion section 14d converts the post-correction coordinate output from the control section 14e into the pre-correction coordinate as the coordinate of the image on which the keystone distortion correction has not yet executed, and outputs the result to the decimal/integer separation section 14c. In more detail, the coordinate conversion section 14d converts the coordinate value of the image (the deformed image), on which the keystone distortion correction has been executed, into the coordinate value of the image (the image with a rectangular shape) on which the correction has not yet been executed, and outputs the result. It should be noted that since the pre-correction image and the post correction image do not have an integral-multiple correspondence with each other, the coordinate value output from the coordinate conversion section 14d includes a decimal fraction.

The decimal/integer separation section 14c separates the coordinate value output from the coordinate conversion section 14d into an integral part and a decimal faction, and supplies the cache memory section 14b with the integral part, and the pixel interpolation section 14h with the decimal fraction, respectively. It should be noted that the cache memory section 14b reads out the interpolation pixel block corresponding to the integral part of the coordinate supplied from the decimal/integer separation section 14c, and supplies the read-out to the pixel interpolation section 14h.

The pixel interpolation section 14h executes an interpolation process based on the interpolation pixel block of the pre-correction image supplied from the cache memory section 14b, thereby generating predetermined pixels of the post-correction image. In other words, the reason therefor is that since the pixels constituting the pre-correction image and the pixels constituting the post-correction image do not have one-on-one correspondence with each other, in order for obtaining the predetermined pixels of the post-correction image, it is necessary to calculate the predetermined pixels from the peripheral pixels corresponding to the pre-correction image based on the interpolation process. Specifically, the pixel interpolation section 14h executes the pixel interpolation process based on the interpolation pixel block supplied from the cache memory section 14b, the decimal fraction value of the pre-correction coordinate supplied from the decimal/integer separation section 14c, and the filter coefficient supplied from the register section 14g to obtain and then output the value of the interpolation pixel (the pixel of the post-correction image).

The double buffer section 14i is provided with two buffers, and stores the interpolation pixel output from the pixel interpolation section 14h in one of the buffers. When the buffer becomes full, the double buffer section 14i executes block transfer of the interpolation pixels stored in the buffer to the frame buffer 13 via the bus master section 14j as the post-correction image data, and at the same time, stores new interpolation pixel output from the pixel interpolation section 14h in the other of the buffers. Further, by repeatedly performing such a process with respect to the two buffers, the interpolation pixels output from the pixel interpolation section 14h are transferred to the frame buffer 13.

The bus master section 14j performs control of the buses (the address bus and the data bus) to the frame buffer 13 when transferring the interpolation pixels stored in the double buffer section 14i to the frame buffer 13.

Then, the operation of the projector 10 when projecting an image will be explained.

Figure 3C:
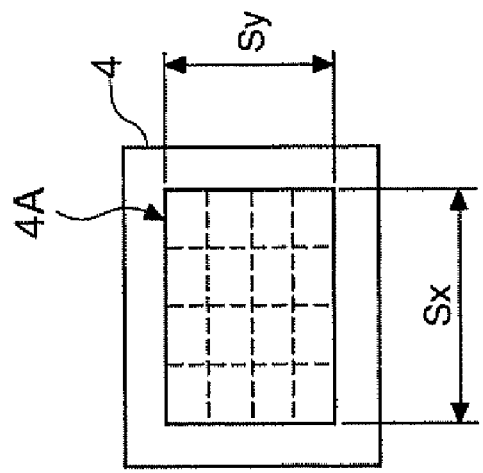
FIGS. 3A through 3C are diagrams showing a relationship between an installation condition of the projector and a projection condition.
Figure 3B:
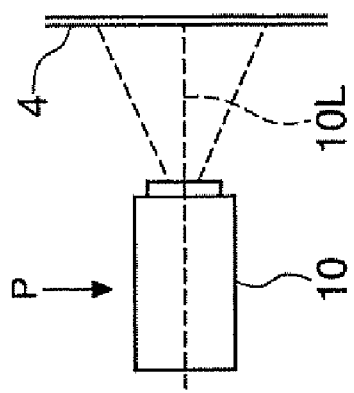
Figure 3A:
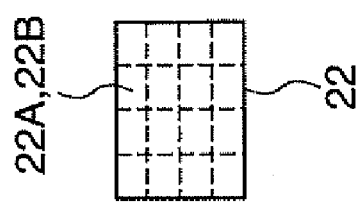

FIGS. 3A through 3C are diagrams showing a relationship between an installation condition of the projector 10 and a projection condition in the screen 4, FIGS. 3A through 3C show an example of installing the projector 10 on a horizontal plane. FIG. 3A shows a condition of the pixels in the liquid crystal panel 22, FIG. 3B shows a positional relationship between the projector 10 and the screen 4, and FIG. 3C shows the projection condition on the screen 4.

Figure 4C:
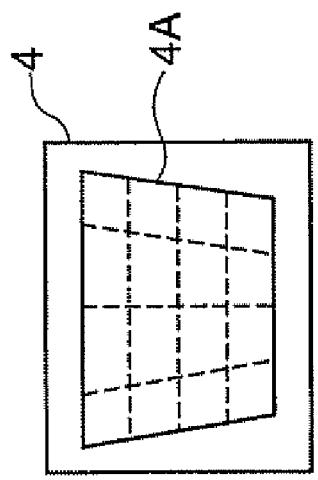
FIGS. 4A through 4C are diagrams showing a relationship between an installation condition of the projector and the keystone distortion.
Figure 4B:
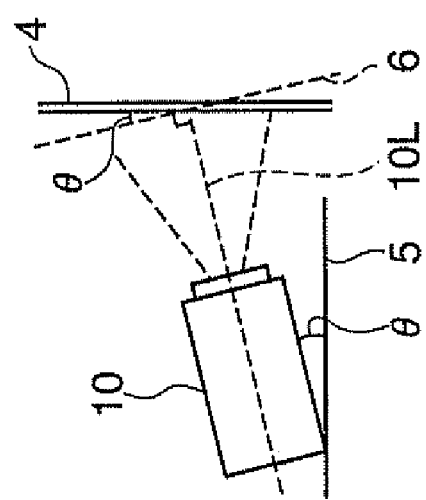
Figure 4A:
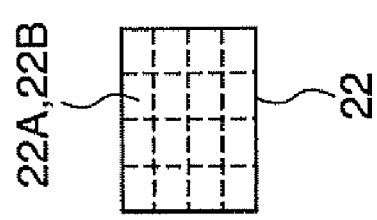
Figure 5C:
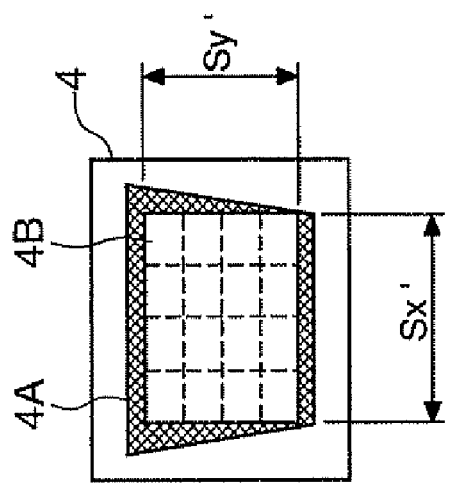
FIGS. 5A through 5C are diagrams showing an example of a display condition of a liquid crystal panel and the keystone distortion correction.
Figure 5B:
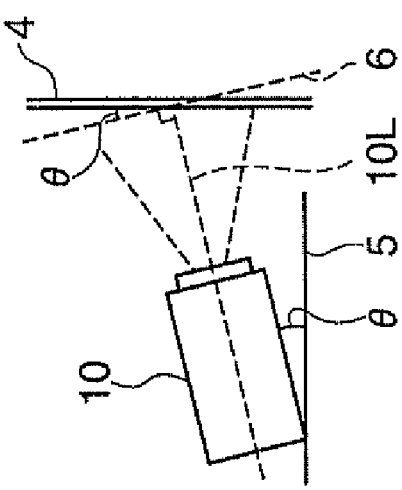
Figure 5A:
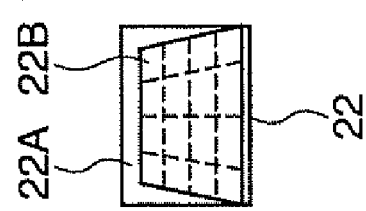

Further, FIGS. 4A through 4C are diagrams showing a relationship between the installation condition of the projector 10 and the keystone distortion of the image projected on the screen 4, and FIGS. 5A through 5C are diagrams showing an example of keystone distortion correction. FIGS. 4A and 5A each show a condition of the pixels in the liquid crystal panel 22, FIGS. 4B and 5B each show a positional relationship between the projector 10 and the screen 4, and FIGS. 4C and 5C each show the projection condition on the screen 4.

The broken lines illustrating the lattice-like patterns in FIGS. 3A, 3C, 4A, 4C, 5A, and 5C are auxiliary lines added for showing the correspondence between the maximum pixel area 22A as the maximum area where an image of the liquid crystal panel 22 can be formed and an image forming area 22B as an area where an image is actually formed by transmitting the light, and the maximum projection area 4A as the maximum area of the screen 4 where the projection is possible and an image projection area 4B as an area where the image is actually projected, and do not denote that such lattice-like patterns are actually formed or displayed.

The condition shown in FIGS. 3A through 3C corresponds, for example, to the case in which the projector 10 is implemented on a horizontal plane, and the screen 4 is implemented along the vertical direction. In this example, as shown in FIG. 3B, the optical axis 10L of the projector 10 is perpendicular to the projection surface of the screen 4. In other words, the optical axis 10L and the normal line of the projection surface of the screen 4 are parallel to each other.

Therefore, as shown in FIG. 3A, the image forming area 22B with an oblong shape is set as the maximum pixel area 22A in which the pixels are arranged in the liquid crystal panel 22, and an image displayed in the image forming area 22B is projected on the maximum projection area 4A with a regular shape. Here, the regular shape generally denotes an oblong with an aspect ratio Sx:Sy of 4:3 or 16:9.

In contrast, in the example shown in FIGS. 4A through 4C, the projector 10 is disposed upward at an angle θ (≠0) with the horizontal installation surface 5, and the optical axis 10L is tilted upward. The projection in a condition in which the optical axis 10L is tilted upward is called "tilted projection," and the angle θ is called a "tilt angle." In the case in which the projection angle of the screen 4 is vertical, the tilt angle θ is equal to the angle formed between the projection surface of the screen 4 and an ideal plane 6 perpendicular to the optical axis 10L.

In the condition shown in FIGS. 4A through 4C, the maximum projection area 4A formed by projecting the oblong image forming area 22B shown in FIG. 4A is distorted to be a trapezoid. This distortion is so called keystone distortion, and the amplitude of the distortion increases in accordance with the tilt angle θ.

Therefore, when the projector 10 performs the keystone distortion correction, the deformed image forming area 22B is used in the liquid crystal panel 22 as shown in FIG. 5A, thus the keystone distortion of the maximum projection area 4A is canceled. The image forming area 22B shown in FIG. 5A has a trapezoidal shape with a shorter upper side and a longer lower side so as to compensate the distortion (with a longer upper side and a shorter lower side) of the maximum projection area 4A. By deforming the composite image data with the keystone distortion correction section 14 (FIG. 1) so as to fit in with the image forming area 22B to display the deformed composite image data on the image forming area 22B, and projecting the deformed composite image data with the light from the light source 21, the oblong image with the same aspect ratio as the original composite image data is projected as illustrated as the image projection area 4B shown in FIG. 5C. Here, the ratio (the length of the upper side/the length of the lower side) between the upper side and the lower side of the image forming area 22B becomes roughly equal to the inverse of the ratio (the length of the upper side/the length of the lower side) between the upper side and the lower side of the maximum projection area 4A.

Although it is possible to project the image projection area 4B with the regular shape on the screen 4 by performing the keystone distortion correction described above on the one hand, since only a part of the maximum pixel area 22A can be used as the image forming area 22B, the size of the image projected on the screen 4 becomes smaller than the maximum projection area 4A on the other hand. It is obvious that the image projection area 4B is smaller than the maximum projection area 4A. Therefore, when the keystone distortion correction is performed, the image is shrunk providing the zooming rate is constant. It should be noted that although FIG. 5C shows the maximum projection area 4A with hatching for the sake of reference, the hatched part corresponds to a non-transmissive part of the maximum pixel area 22A, and is never viewed actually.

Figure 6C:
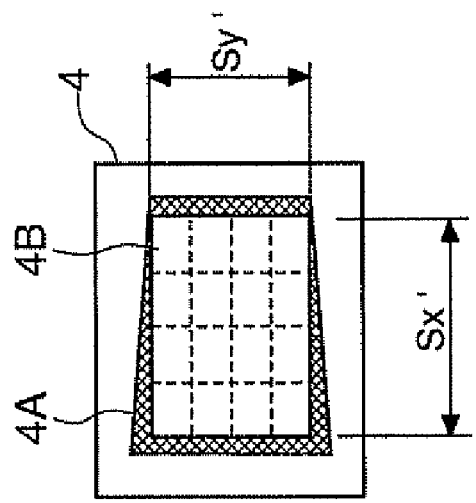
FIGS. 6A through 6C are diagrams showing another example of a display condition of the liquid crystal panel and the keystone distortion correction.
Figure 6B:
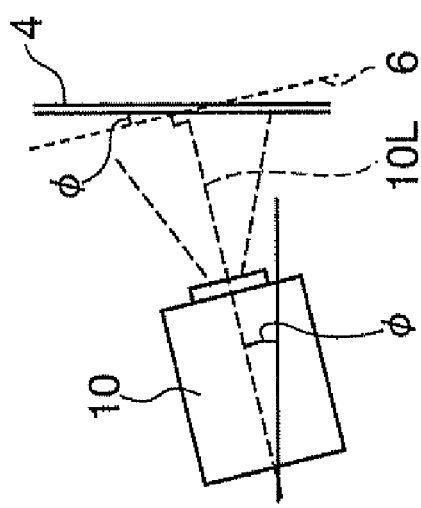
Figure 6A:
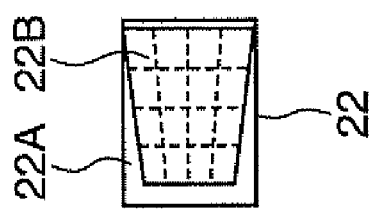

Although FIGS. 4A through 4C, and 5A through 5C show examples of the case in which the projector 10 is implemented upward at the angle θ with respect to the horizontal implementation surface 5, the keystone distortion can be caused in the case in which the projector 10 is implemented while being tilted in the lateral direction (the horizontal direction). FIGS. 6A through 6C are diagrams of the projector shown in FIGS. 3A through 3C and viewed in the direction of the arrow P. In the example shown in FIGS. 6A through 6C, the projector 10 is implemented in the condition of having the optical axis 10L tilted in the horizontal direction at an angle φ (≠0) with the normal line of the projection surface of the screen 4.

In the condition shown in FIGS. 6A through 6C, the maximum projection area 4A formed by projecting the oblong image forming area 22B is distorted in the horizontal direction to be a trapezoid in the same manner as shown in FIG. 4A.

Therefore, when the projector 10 performs the keystone distortion correction, the deformed image forming area 22B is used in the liquid crystal panel 22 as shown in FIG. 6A, thus the keystone distortion of the maximum projection area 4A is canceled. The image forming area 22B shown in FIG. 6A has a trapezoidal shape with a shorter left side and a longer right side so as to compensate the distortion (with a longer left side and a shorter right side) of the maximum projection area 4A. By deforming the composite image data with the keystone distortion correction section 14 (FIG. 1) so as to fit in with the image forming area 22B to display the deformed composite image data on the image forming area 22B, and projecting the deformed composite image data with the light from the light source 21, the oblong image with the same aspect ratio as the original composite image data is projected as illustrated as the image projection area 4B shown in FIG. 6C. Here, the ratio (the length of the left side/the length of the right side) between the left side and the right side of the image forming area 22B becomes roughly equal to the inverse of the ratio (the length of the left side/the length of the right side) between the left side and the right side of the maximum projection area 4A.

It should be noted that in such keystone distortion correction, the size of the image projected on the screen 4 becomes smaller than the maximum projection area 4A as is the case with the example described above. Although FIG. 6C shows the maximum projection area 4A with hatching for the sake of reference, the hatched part corresponds to a non-transmissive part of the maximum pixel area 22A, and is never viewed actually.

FIG. 7 is a diagram showing the projection state in the case in which the projector 10 is disposed with tilts respectively in the horizontal direction and in the vertical direction. In the case in which the projector 10 is disposed with tilts in both the horizontal direction and the vertical direction, the keystone distortion is caused in the image projected on the screen 4 in both the lateral direction (the horizontal direction) and the up-and-down direction (the vertical direction), respectively, as shown in the part A of FIG. 7. By correcting the image displayed on the liquid crystal panel 22 as shown in the part B of FIG. 7 (correcting the pre-correction image 22A as the maximum pixel area into the post-correction image 22B as the image forming area), the adjustment can be executed so that the image projection area 4B projected on the screen 4 has a substantially rectangular shape.

B. Outline of the Operation of the Embodiment of the Invention

Then, an outline of the operation of the embodiment of the invention will be explained. The coordinate system conversion in the case of correcting the pre-correction image shown in the part A of FIG. 8 into the post-correction image shown in the part B of FIG. 8 is expressed by the perspective transformation of the formula 1 described as follows. Here, A through I denote the conversion coefficients.

$$x = \frac{AX + BY + C}{GX + HY + I} \quad (1)$$
$$y = \frac{DX + EY + F}{GX + HY + I}$$

When four points in the post-correction coordinate are figured out, the conversion coefficients A through H can be obtained along the following formula 2. It should be noted that I=1 is assumed.

$$\begin{pmatrix} X_0 & Y_0 & 1 & 0 & 0 & 0 & -x_0X_0 & -x_0Y_0 \\ 0 & 0 & 0 & X_0 & Y_0 & 1 & -y_0X_0 & -y_0Y_0 \\ X_1 & Y_1 & 1 & 0 & 0 & 0 & -x_1X_1 & -x_1Y_1 \\ 0 & 0 & 0 & X_1 & Y_1 & 1 & -y_1X_1 & -y_1Y_1 \\ X_2 & Y_2 & 1 & 0 & 0 & 0 & -x_2X_2 & -x_2Y_2 \\ 0 & 0 & 0 & X_2 & Y_2 & 1 & -y_2X_2 & -y_2Y_2 \\ X_3 & Y_3 & 1 & 0 & 0 & 0 & -x_3X_3 & -x_3Y_3 \\ 0 & 0 & 0 & X_3 & Y_3 & 1 & -y_3X_3 & -y_3Y_3 \end{pmatrix} \begin{pmatrix} A \\ B \\ C \\ D \\ E \\ F \\ G \\ H \end{pmatrix} = \begin{pmatrix} x_0 \\ y_0 \\ x_1 \\ y_1 \\ x_2 \\ y_2 \\ x_3 \\ y_3 \end{pmatrix} \quad (2)$$

In the case of executing the keystone distortion correction, in order for obtaining the pixel value of the predetermined coordinate of the post-correction image, the coordinate of the pixel of the pre-correction image corresponding thereto is obtained from the coordinate of the post-correction image by the inverse perspective transformation using the perspective transformation described above, and the keystone distortion correction is executed based on the coordinate thus obtained. On this occasion, since the coordinate of the pre-correction image and the coordinate of the post-correction image do not have one-on-one correspondence with each other, it is necessary to execute the interpolation process for obtaining the value of the target pixel from a plurality of pixels of the pre-correction image.

Figure 9:
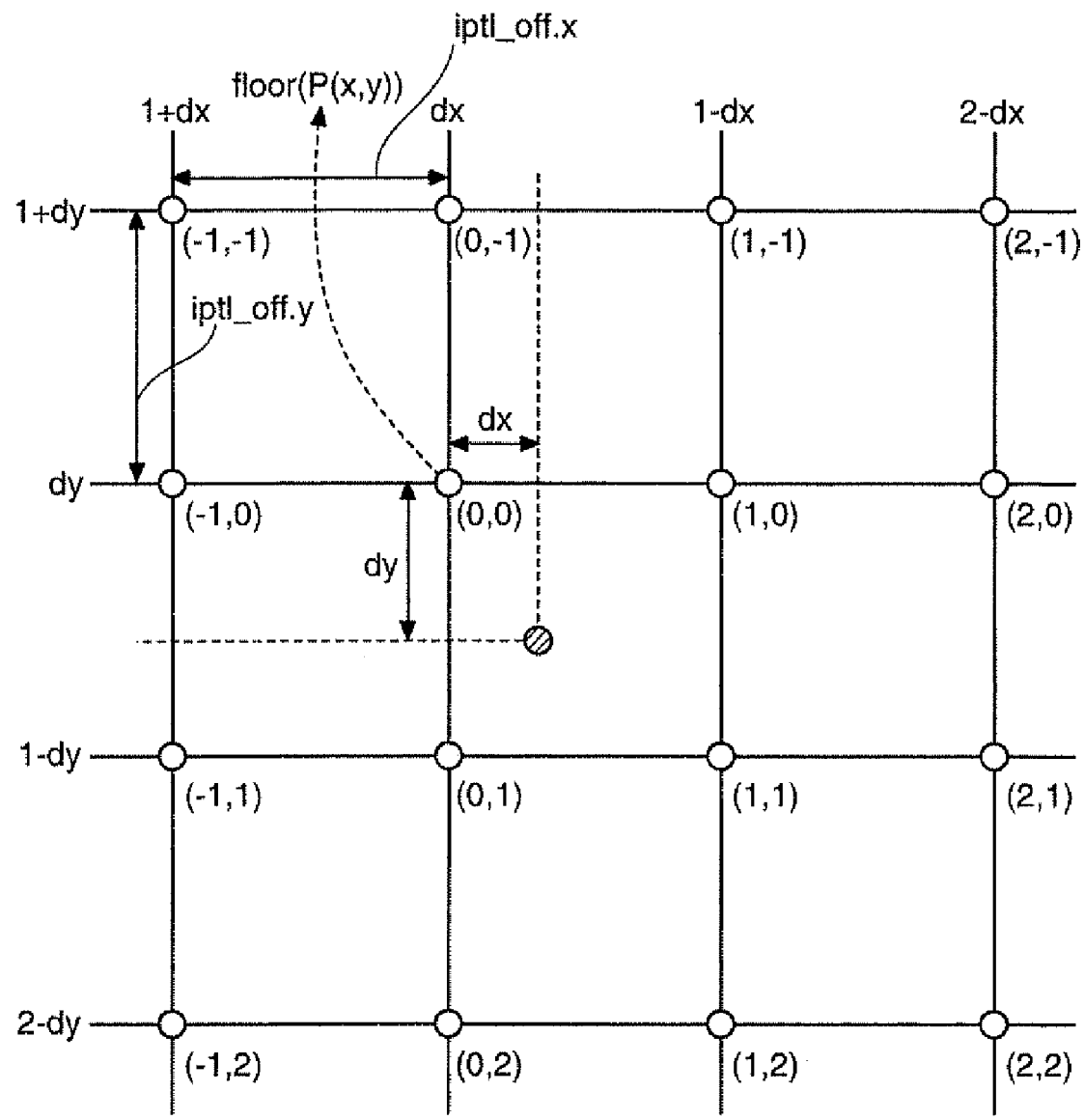
FIG. 9 is a block diagram showing an interpolation pixel block.

FIG. 9 is a diagram showing an example of the interpolation process. In the example shown in FIG. 9, the pixels of the pre-correction image are illustrated with 16 white circles, and the pixel of the post-correction image is illustrated with one hatched circle. The pixel of the post-correction image does not match with the arrangement positions of the pixels of the pre-correction image, but is disposed at a position with a shift of (dx,dy) from the closest pixel. In such a case, the pixel value of the post-correction image can be obtained by the interpolation from the 16 pixels of the pre-correction image disposed in the periphery of the coordinate (x,y) obtained by the inverse perspective transformation described above.

Figure 10B:
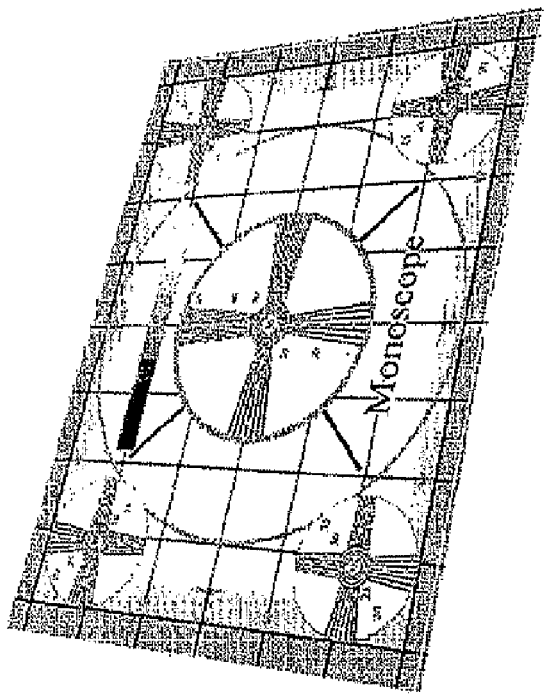
FIGS. 10A and 10B are diagrams showing correspondence between the image to be corrected and the corrected image.
Figure 10A:
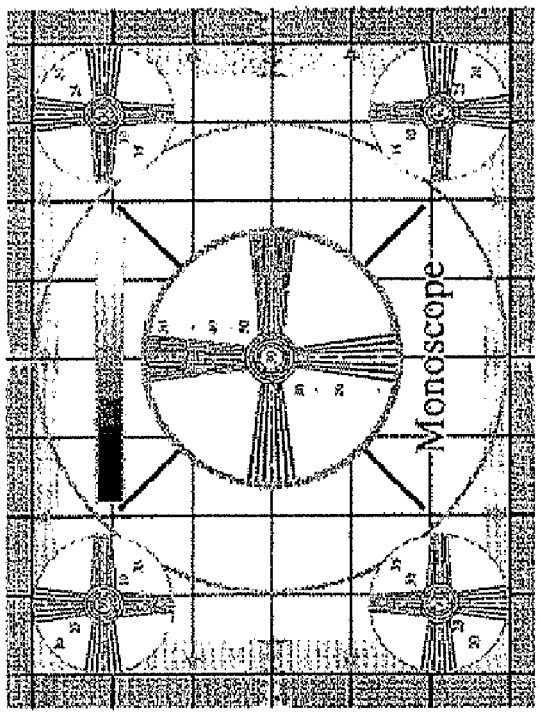

Incidentally, the post-correction image has a quadrangular shape with distortion instead of a rectangular shape as shown in FIG. 10B. On this occasion, the scan lines (the lines illustrated with the arrows) in the post-correction image become the oblique lines in the pre-correction image as shown in FIG. 10A. Therefore, in the case of calculating the value of the pixel of each scan line of the post-correction image based on the inverse perspective transformation described above, it is necessary to obtain the pixels of the pre-correction image along the oblique lines shown in FIG. 10A. Therefore, it is necessary to prepare a large amount of line buffers for storing the pre-correction image data. In the case, for example, of correcting the image with a resolution of XGA (1024×768) at 30 degrees from the vertical line and 20 degrees from the horizontal line, nearly 400 lines of line buffers become necessary according to a provisional estimation.

Figure 11:
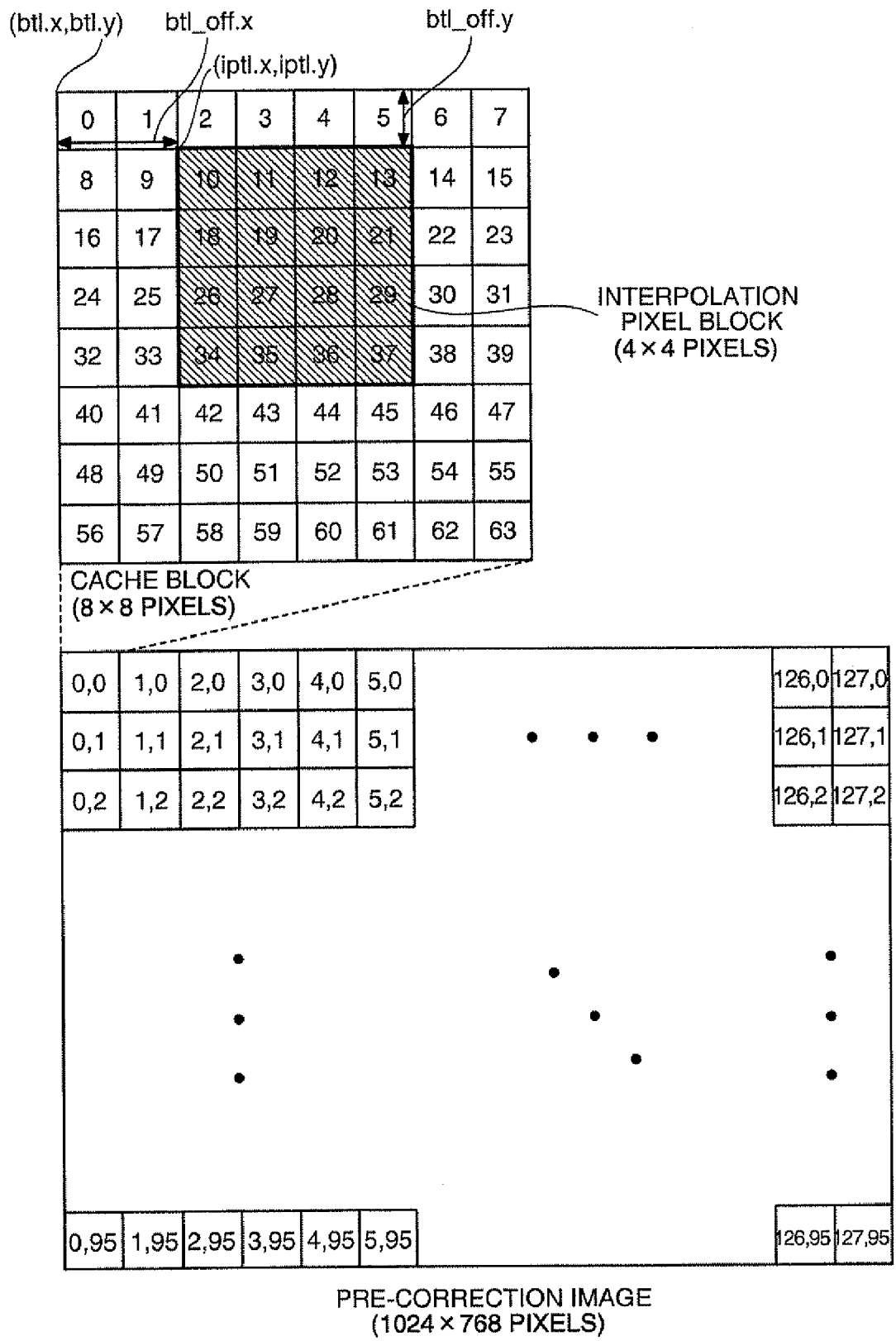
FIG. 11 is a diagram showing a relationship between a cache block and the interpolation pixel block.

Therefore, in the present embodiment, as shown in FIG. 11, the pre-correction image is divided into cache blocks each composed of 8×8 pixels (totally 64 pixels), and stores the pre-correction image in the SRAM 14b1 of the cache memory section 14b in units of the cache block. Further, the interpolation pixel block composed of 4×4 pixels is read out from the cache block stored in the SRAM 14b1 to execute the interpolation process, thereby generating the post-correction image. It should be noted that in the example shown in FIG. 11, the pre-correction image is composed of 1024×768 pixels corresponding to the XGA resolution, and such a pre-correction image is divided into 126×95 cache blocks. The character strings (x,y) described in the respective cache blocks represent the locations of the respective cache blocks in both the lateral direction (x) and the vertical direction (y). Further, the numbers 0 through 63 shown in the respective pixels constituting the cache block are the numbers provided for distinguishing the pixels.

At the beginning of the keystone distortion correction process, the SRAM 14b1 of the cache memory section 14b stores the 512 cache blocks of (0,0) through (127,3) of the pre-correction image as shown in FIG. 12 irrespective of the content of the correction of the post-correction image. Further, after the correction process starts, the pixel interpolation section 14h reads out the interpolation pixel block to be the object of the correction from the SRAM 14b1 of the cache memory section 14b, and executes the interpolation process.

Figure 13:
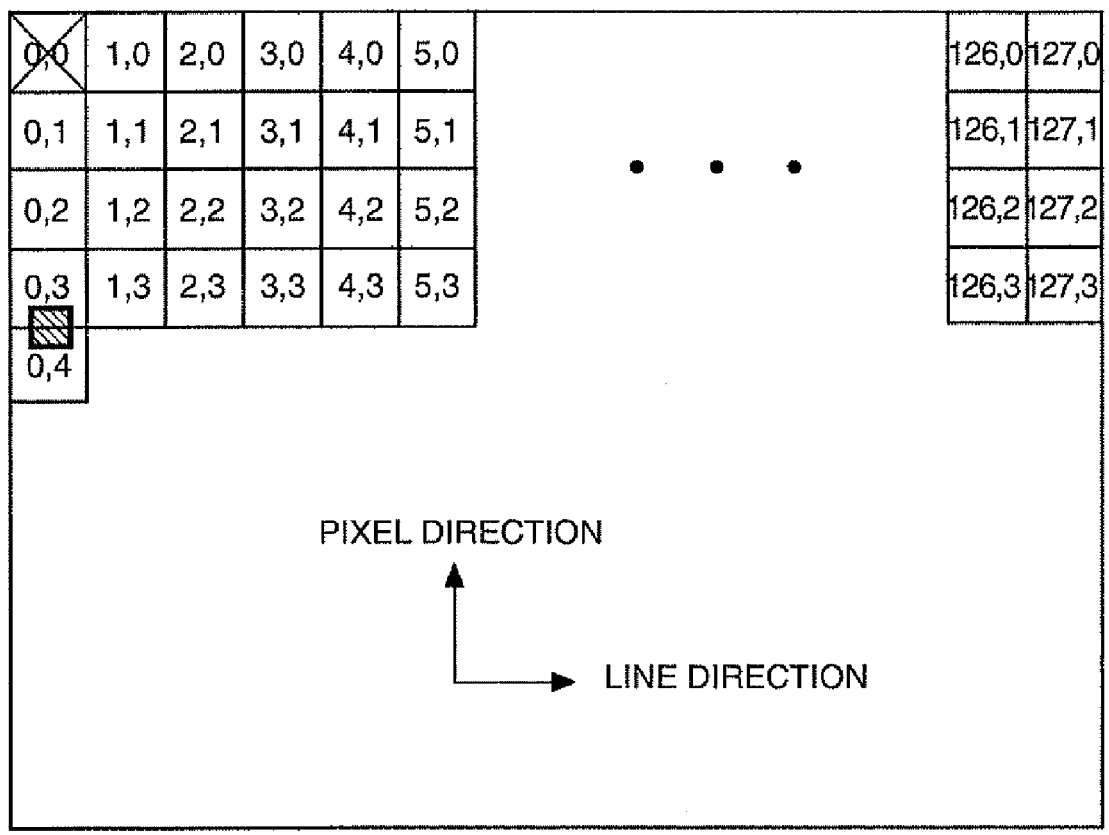
FIG. 13 is a diagram for explaining an overwrite process to a cache.

On this occasion, in the case in which there is no cache block to be the object in the SRAM 14b1, the cache block which is farthest from obtained cache block in the second direction in the pre-correction image is overwritten with a obtained new cache block as shown in FIG. 13. In the example shown in FIG. 13, in the case in which the cache blocks (0,0) through (127,3) are stored in the SRAM 14b1, when the area with hatching is designated as the interpolation pixel block, the cache block denoted with (0,4) does not exist on the cache memory section 14b, and therefore, the cache block denoted with (0,4) is read out from the frame buffer 13. Further, in the pre-correction image stored in the SRAM 14b1, the cache block of (0,0) which is farthest from obtained cache block (0,4) in the second direction is overwritten with the cache block of (0,4).

Figure 14:
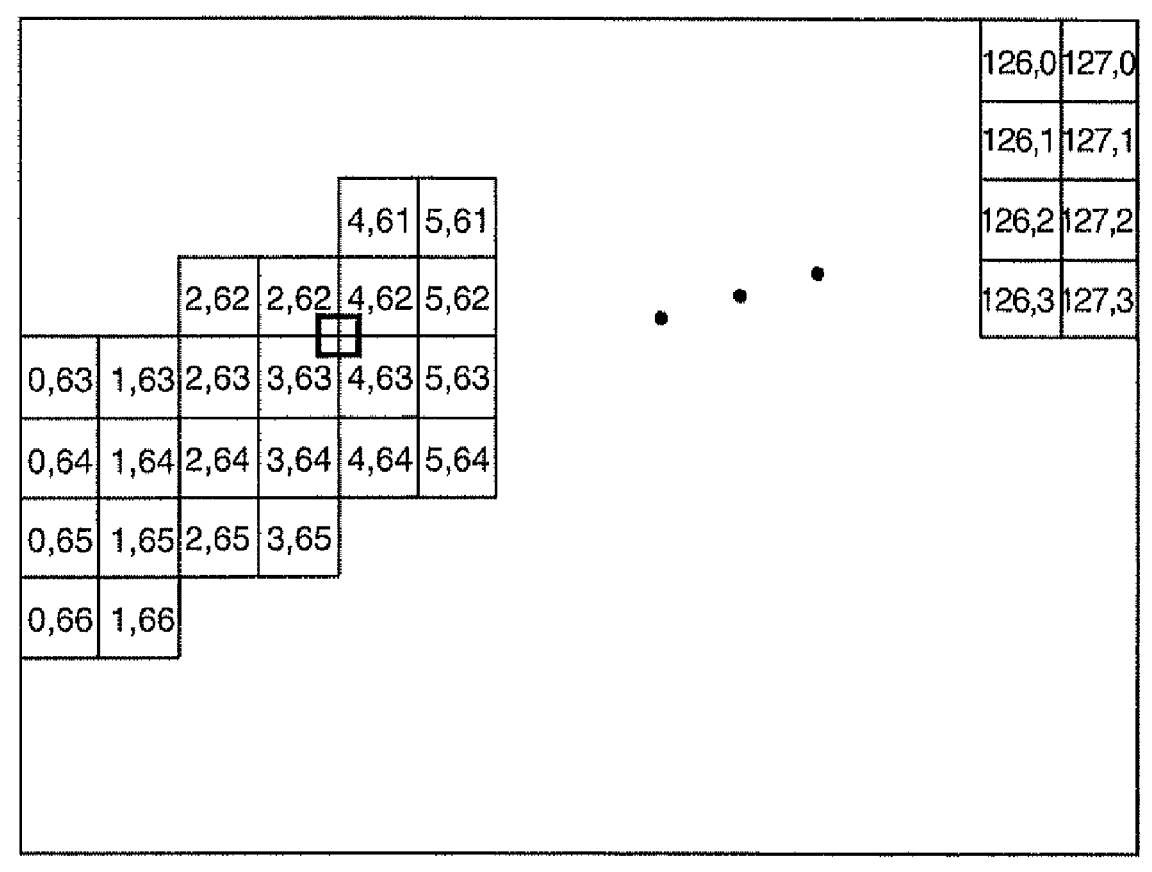

When such a process is repeatedly executed, and the process progresses to some extent, the overwriting process described above is repeatedly executed, and the condition in which the cache blocks along the arrow shown in FIG. 10A are stored in the SRAM 14b1 is obtained. FIG. 14 is a schematic diagram showing an example of locations of the cache blocks, which is stored in the SRAM 14b1, in the pre-correction image, when the process progresses to some extent. As shown in the drawing, as the correction process progresses, the cache blocks stored in the SRAM 14b1 become in a condition in which the cache blocks located on the line in an oblique direction in the pre-correction image are stored.

As described hereinabove, in the present embodiment, it is arranged that the SRAM 14b1 of the cache memory section 14b is capable of storing a certain amount (512 in the example shown in FIG. 12) of cache blocks, obtains and stores a certain amount of cache blocks at the initial part of the pre-correction image at the beginning of the correction process, and overwrite the cache block which is farthest from obtained cache block in the second direction if no cache block to be the object of the correction process exists in the SRAM 14b1. Therefore, the number of cache blocks stored in the SRAM 14b1 is always 512, and since the number corresponds to 32 lines when reduced to the number of lines, it is possible to save the capacity of the SRAM 14b1.

C. Detailed Operation of the Embodiment of the Invention

Figure 15:
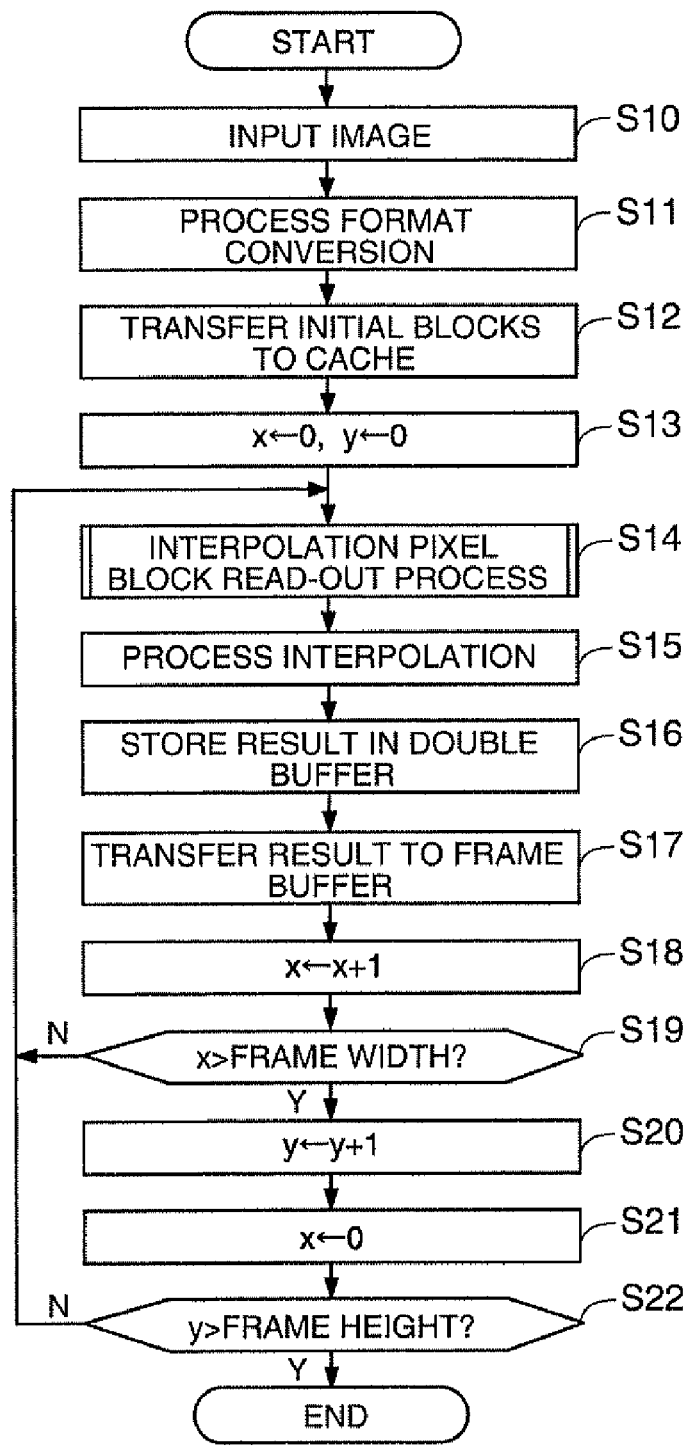
FIG. 15 is a flowchart for explaining a process executed in the present embodiment.

Then, a detailed operation of the embodiment of the invention will be explained. FIG. 15 is a flow chart for explaining the flow of the process of the keystone distortion correction. When the process is started, the following steps are executed.

In the step S10, the projector 10 inputs an image from the image supply device 2. Specifically, the projector 10 inputs the image signal from the image supply device 2, removes the sync signal in the input circuit 11, and then converts the image signal into the digital signal with the A/D conversion to supply the image processing circuit 12 with the digital signal. The image processing circuit 12 executes the color correction and so on on the image supplied from the input circuit 11, and then write the image in the frame buffer 13 as the original image.

In the step S11, the format of the original image is converted into the format the keystone distortion correction circuit 14 can easily read out, and stores the original image in the frame buffer 13 as the pre-correction image. Specifically, the image composition circuit 18 executes the process of converting the format of the image on which the IP conversion is executed by the IP conversion circuit 16, the scaling process is executed by the scaling circuit 17, and the combination process with the menu image generated by the menu image generation circuit 19 is executed.

Figure 16:
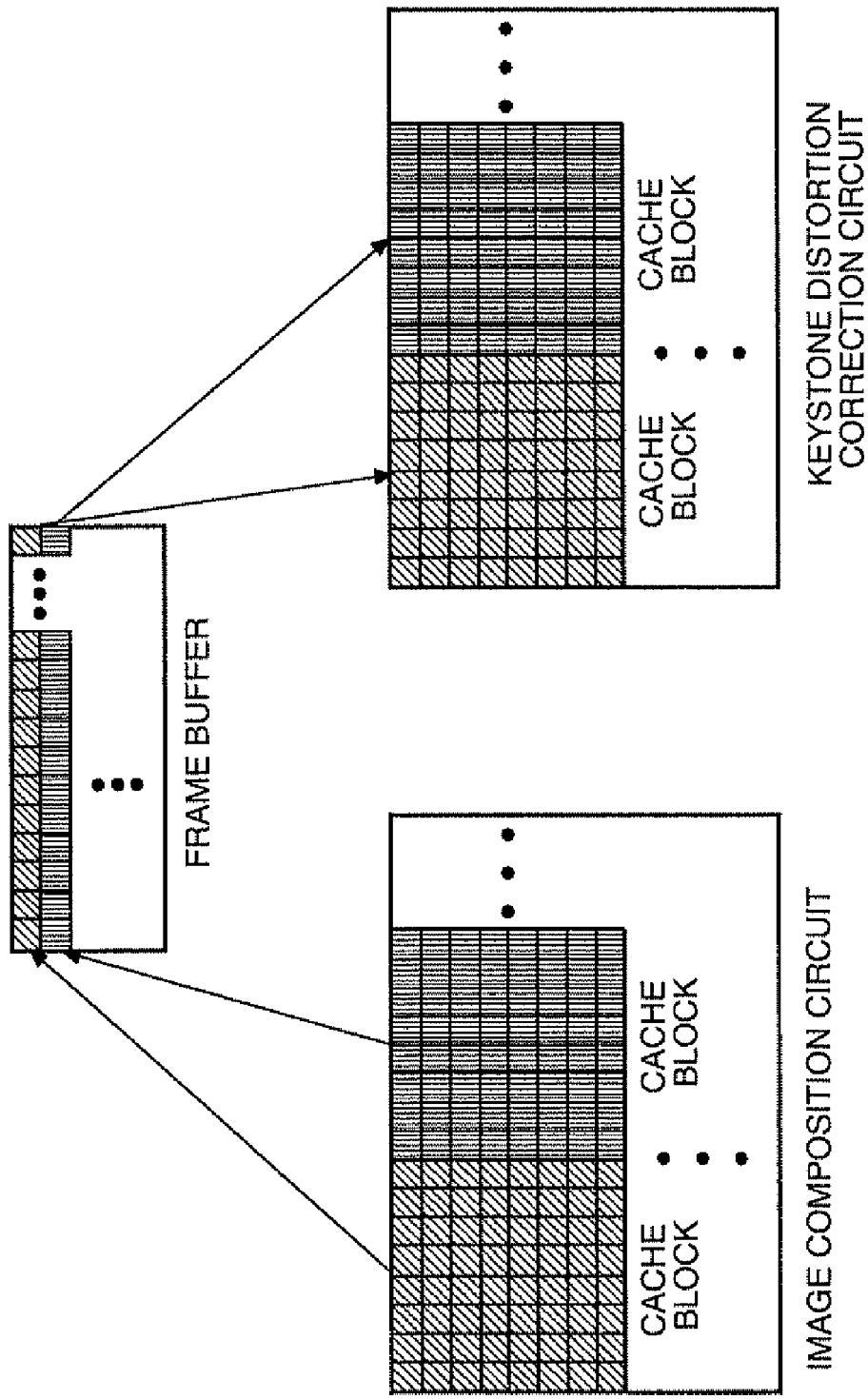
FIG. 16 is a diagram for explaining a format conversion.
Figure 17:
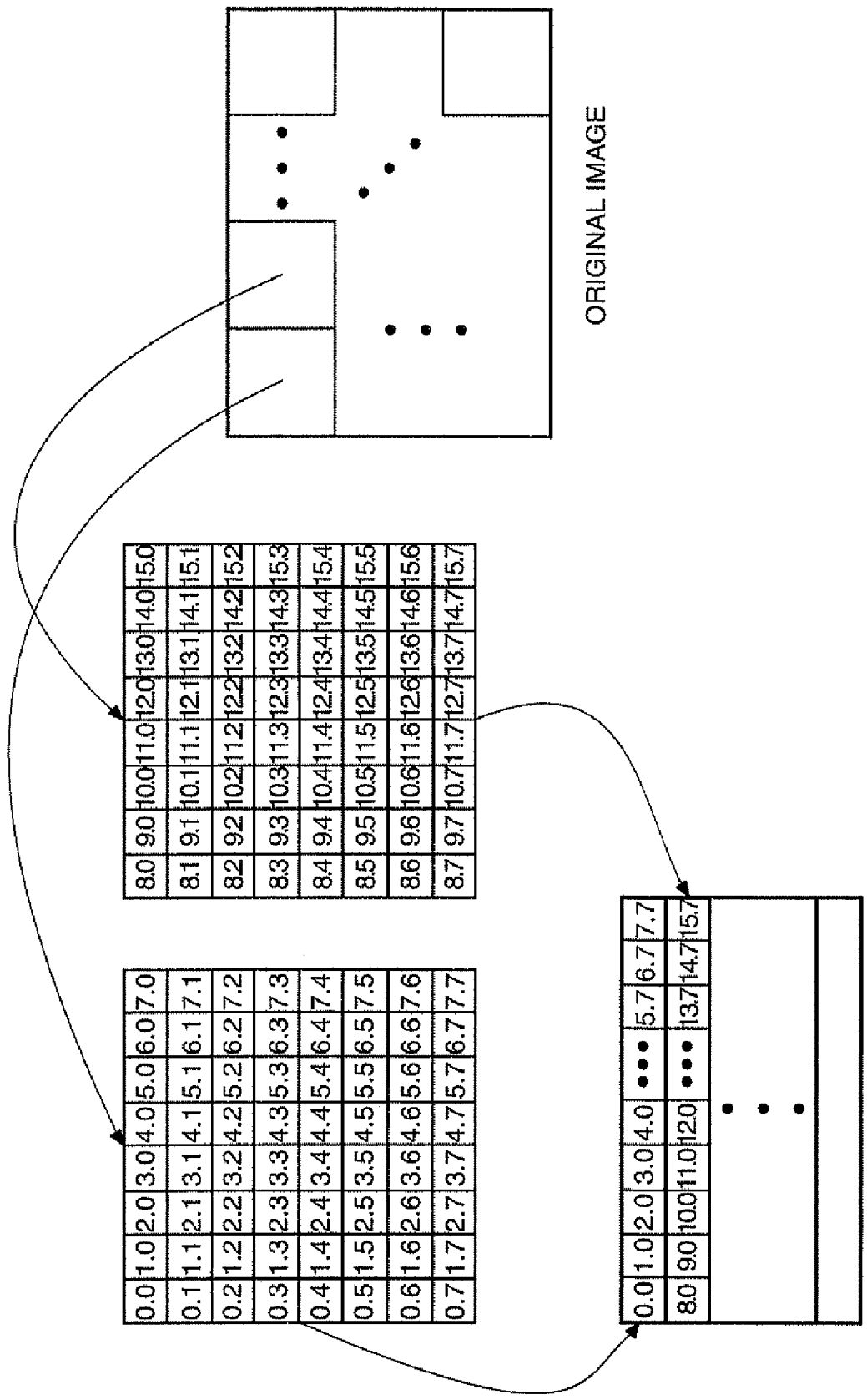
FIG. 17 is a diagram for explaining a format conversion.

FIGS. 16 and 17 are diagrams for explaining the details of the format conversion. In the case in which the pixel data is read out from the frame buffer 13 in units of the cache block, and stored in the cache memory section 14b, the pixels constituting the cache block stored in the frame buffer 13 are stored in a configuration as shown in FIG. 11. In this case, although the pixel data (e.g., 0 through 7, 8 through 15, 16 through 23, . . . ) constituting each line is stored in an area with contiguous addresses, the lines are stored in areas with discrete addresses. Therefore, when reading out such cache blocks from the frame buffer 13, there arises necessity of executing the read-out process eight times (read out of the lines 0 through 7, read out of the lines 8 through 15, . . . ). Therefore, in the present embodiment, the image composition circuit 18 executes reordering so that the pixel data constituting each of the cache blocks are stored in the area with contiguous addresses, and stores the image thus obtained in the frame buffer 13 again as the pre-correction image. The keystone distortion correction circuit 14 reads out the cache block (64 pixels), on which the reordering is thus executed, with a single access to the frame buffer 13, thereby increasing the access rate. In other words, since the frame buffer 13 is composed of the DRAM with a low access rate compared to the cache memory section 14b, by reducing the number of times of access to increase the access rate, it becomes possible to execute the keystone distortion correction at a high speed.

In the example shown in FIG. 16, the image composition circuit 18 executes the reordering on the two cache blocks (the block with oblique hatching and the block with vertical hatching) supplied to the image composition circuit 18, and each of the blocks is stored in the area with contiguous addresses in the frame buffer 13. In other words, in FIG. 17, the two cache blocks (the block including the pixels (0,0) through (7,7) and the block including the pixels (8,0) through (15,7)) included in the original image are stored therein so that the first cache block (0,0) through (7,7) is stored in an area with contiguous addresses, and the second cache block (8,0) through (15,7) is stored in an area with contiguous addresses. Further, the keystone distortion correction circuit 14 reads out the one block from the area with the contiguous addresses (executes the block transfer) when reading out the image (pre-correction image) on which the reordering has been executed, and stored in the frame buffer 13 in units of the block, thereby making it possible to increase the read-out rate.

In the step S12, the bus master section 14a of the keystone distortion correction circuit 14 transfers the cache blocks included in the initial block from the pre-correction image stored in the frame buffer 13 to the cache memory section 14b. It should be noted that the initial block denotes the 512 cache blocks of (0,0) through (127,3) included in the pre-correction image as shown in FIG. 12, and these cache blocks are transferred from the frame buffer 13 to the cache memory section 14b.

When the transfer of the initial block is terminated, the process proceeds to the step S13, and "0" is set in the variables x and y. Further, the process proceeds to the step S14, and a process of reading out the pixels corresponding to the interpolation pixel block shown in FIG. 11 from the cache block stored in the SRAM 14b1, and transferring the pixels thus read out to the pixel interpolation section 14h is executed. In more detail, the control section 14e sequentially outputs the post-correction coordinates to the coordinate conversion section 14d along the line illustrated with the arrow shown in FIG. 10B based on the parameter stored in the register section 14g. The coordinate conversion section 14d calculates the coordinate value (pre-correction coordinate value) corresponding to the pre-correction image based on the formula 1 described above, and outputs the result to the decimal/integer separation section 14c. The decimal/integer separation section 14c separates the coordinate value of the pre-correction coordinate into a decimal fraction and a integral part, and supplies the pixel interpolation section 14h with the decimal fraction, and the cache memory section 14b with the integral part. The control section 14b2 of the cache memory section 14b specifies the range of the interpolation pixel block corresponding to the integer supplied from the decimal/integer separation section 14c, determines whether or not the cache block corresponding to the interpolation pixel block exists in the SRAM 14b1, and transfers the pixel data included in the interpolation pixel block to the pixel interpolation section 14h if it exists, or overwrites the cache block which is farthest from obtained cache block in the second direction in the pre-correction image as shown in FIG. 13, and then transfers the interpolation pixel block to the pixel interpolation section 14h if it does not exist.

In the step S15, the pixel interpolation section 14h executes the interpolation process based on the interpolation pixel block thus transferred from the cache memory section 14b in the step S14, and calculates the pixel value of the predetermined pixel of the post-correction image.

In the step S16, the pixel value of the predetermined pixel of the post-correction image calculated in the step S15 is written to one of the buffers of the double buffer section 14i. If the one of the buffers of the double buffer section 14i becomes full, the process proceeds to the step S17, and the pixel data written to the one of the buffers is transferred to the frame buffer 13, and is made to be stored there as the post-correction image.

In the step S18, the value of the variable x is incremented by "1." Further, the process proceeds to the step S19, whether or not the value of the variable x is larger than the frame width is determined, and the process proceeds to the step S20 if it is larger (Yes in the step S19), or the process goes back to the step S14 to repeat the same process as the case described above in the other cases (No in the step S19). In the subsequent step of S20, the value of the variable y is incremented by "1," and in the step S21, "0" is set in the variable x. Further, in the step S22, whether or not the value of the variable y is larger than the frame height is determined, and the process is terminated if it is larger (Yes in the step S22), or the process goes back to the step S14 to repeat the same process as the case described above in the other cases (No in the step S22).

Figure 18:
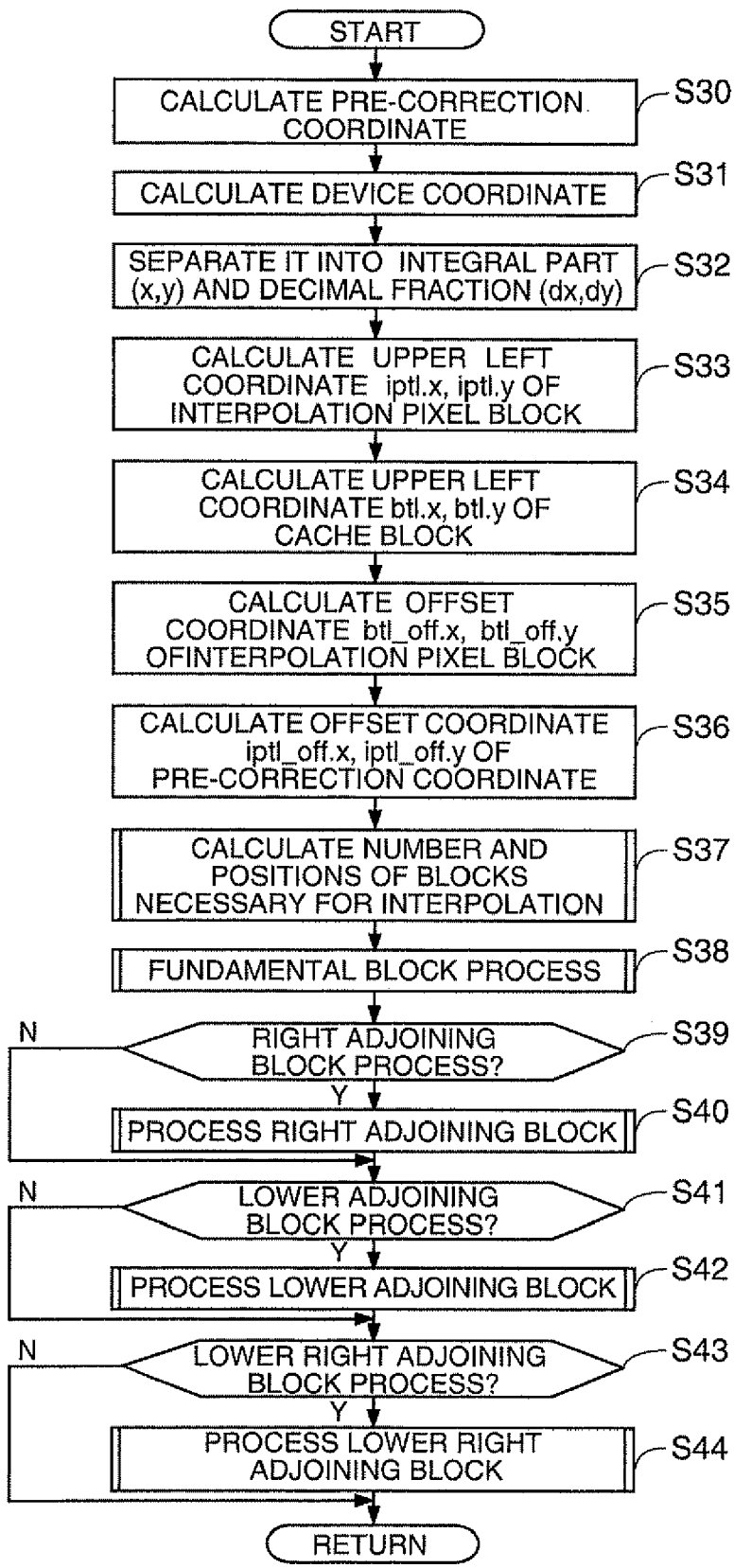
FIG. 18 is a flowchart for explaining details of the step S14 shown in FIG. 15.

Then, details of "the interpolation pixel block read out process" shown in the step S14 of FIG. 15 will be explained with reference to FIG. 18. When the process shown in FIG. 18 is started, the following steps are executed.

Specifically, in the step S30, a process of calculating the post-correction coordinate is executed. In more detail, the control section 14e outputs the coordinate of the predetermined pixel of the post-correction image shown in FIG. 10B, and the coordinate conversion section 14d calculates the pre-correction coordinate based on the formula 1 described above and the conversion coefficients A through I.

In the step S31, the coordinate conversion section 14d converts the pre-correction coordinate calculated in the step S30 into a device coordinate. In more detail, the coordinate conversion section 14d executes the conversion from the coordinate system having the center of the image as the origin to the device coordinate system having the upper left of the image as the origin. Further, the coordinate conversion section 14*d* outputs the pre-correction coordinate (the coordinate of the hatched circle shown in FIG. 9) converted into the device coordinate.

In the step S32, the decimal/integral separation section 14*c* separates the pre-correction coordinate output from the coordinate conversion section 14*d* into the integral part (x,y) and the decimal fraction (dx,dy) shown in FIG. 9, and supplies the cache memory section 14*b* with the integral part, and the pixel interpolation section 14*h* with the decimal fraction, respectively. It should be noted that the integral part is used for designation of the address in reading out the interpolation pixel block, and the decimal fraction is used in the interpolation process.

In the step S33, the control section 14*b*2 of the cache memory section 14*b* obtains the upper left coordinate (iptl.x, iptl.y) of the interpolation pixel block shown in FIG. 11. In more detail, the control section 14*b*2 obtains the upper left coordinate based on the following formula using the integral part (x,y) of the pre-correction coordinate supplied from the decimal/integer separation section 14*c*, Symbol.width (=4) representing the width of the interpolation pixel block, and Symbol.height (=4) representing the height thereof.

$$iptl.x = x - Symbol.width/2 + 1 \quad (3.1)$$

$$iptl.y = y - Symbol.height/2 + 1 \quad (3.2)$$

In the step S34, the control section 14*b*2 of the cache memory section 14*b* obtains the upper left coordinate (btl.x, btl.y) of the cache block shown in FIG. 11. In more detail, the control section 14*b*2 obtains the upper left coordinate based on the following formula using the iptl.x, iptl.y obtained in the step S33, Block.width (=8) representing the width of the cache block, and Block.height (=8) representing the height thereof.

$$btl.x = iptl.x/Block.width \quad (4.1)$$

$$btl.y = iptl.y/Block.height \quad (4.2)$$

In the step S35, the control section 14*b*2 of the cache memory section 14*b* obtains the offset btl_off.x, btl_off.y in the cache block of the interpolation pixel block shown in FIG. 11. In more detail, the control section 14*b*2 obtains the offset based on the following formula using the iptl.x, iptl.y obtained in the step S33, Block.width (=8) representing the width of the cache block, and Block.height (=8) representing the height thereof. It should be noted that "MOD" denotes an operator for obtaining the remainder.

$$btl\_off.x = iptl.x \; MOD \; Block.width \quad (5.1)$$

$$btl\_off.y = iptl.y \; MOD \; Block.height \quad (5.2)$$

In the step S36, the control section 14*b*2 of the cache memory section 14*b* obtains the offset iptl_off.x, iptl_off.y in the interpolation pixel block of the pre-correction coordinate (x,y) shown in FIG. 9. In more detail, the cache memory section 14*b* obtains the offset based on the following formula using the iptl.x, iptl.y obtained in the step S33, and the integral part (x,y) supplied from the decimal/integer separation section 14*c*.

$$iptl\_off.x = x - iptl.x \quad (6.1)$$

$$iptl\_off.y = y - iptl.y \quad (6.2)$$

In the step S37, the control section 14*b* 2 of the cache memory section 14*b* calculates the number and positions of cache blocks necessary for the interpolation. Specifically, as shown in FIGS. 19A though 19D, there are four patterns in the cache blocks necessary for the interpolation depending on the positional relationship between the interpolation pixel block and the cache block. FIG. 19A shows the case in which the interpolation pixel block exists inside the cache block, and in this case, only the present cache block (hereinafter referred to as a "fundamental block") is taken as the object of the processing. FIG. 19B shows the case in which the interpolation pixel block runs off the right side of the fundamental block, and in this case, the adjoining cache block (hereinafter referred to as a "right adjoining block") on the right side of the fundamental block becomes the object of the processing together with the fundamental block. FIG. 19C shows the case in which the interpolation pixel block runs off the lower side of the fundamental block, and in this case, the adjoining cache block (hereinafter referred to as a "lower adjoining block") on the lower side of the fundamental block becomes the object of the processing together with the fundamental block. FIG. 19D shows the case in which the interpolation pixel block runs off the lower right side of the fundamental block, and in this case, the right adjoining block, the lower adjoining block, and the adjoining cache block (hereinafter referred to as a "lower right adjoining block") on the lower right side of the fundamental block become the object of the processing together with the fundamental block. In the process of the step S37, as described later with reference to FIG. 20, the number and positions of blocks necessary for interpolation are calculated.

In the step S38, the control section 14*b*2 of the cache memory section 14*b* executes a "fundamental block process" as the process with respect to the fundamental block. In more detail, the control section 14*b*2 determines whether or not the fundamental block exists in the SRAM 14*b*1, and reads out the interpolation pixel block to transfer it to the pixel interpolation section 14*h* if it exists, or reads out the cache block corresponding to the fundamental block from the frame buffer 13 and overwrites the cache block which is farthest from obtained cache block in the second direction in the pre-correction image with the cache block thus read out if it does not exist. It should be noted that this process will be described later in detail with reference to FIG. 21.

In the step S39, whether or not the process to the right adjoining block is necessary is determined, and if it is determined that the process is necessary, the process proceeds to the step S40, and in the other cases, the process proceeds to the step S41. Specifically, in the cases shown in FIGS. 19B and 19D, since the process to the right adjoining block becomes necessary, the process proceeds to the step S40, and in the other cases, the process proceeds to the step S41.

In the step S40, the control section 14*b*2 executes a "right adjoining block process" as the process with respect to the right adjoining block. In more detail, the control section 14*b*2 determines whether or not the right adjoining block exists in the SRAM 14*b*1, and reads out the interpolation pixel block to transfer it to the pixel interpolation section 14*h* if it exists, or reads out the cache block corresponding to the right adjoining block from the frame buffer 13 and overwrites the cache block which is farthest from obtained cache block in the second direction in the pre-correction image with the cache block thus read out if it does not exist. It should be noted that this process will be described later in detail with reference to FIG. 21.

In the step 341, whether or not the process to the lower adjoining block is necessary is determined, and if it is determined that the process is necessary, the process proceeds to the step S42, and in the other cases, the process proceeds to the step S43. Specifically, in the cases shown in FIGS. 19C and 19D, since the process to the lower adjoining block becomes necessary, the process proceeds to the step S42, and the other cases, the process proceeds to the step S43.

In the step S42, the control section 14b2 executes a "lower adjoining block process" as the process with respect to the lower adjoining block. In more detail, the control section 14b2 determines whether or not the lower adjoining block exists in the SRAM 14b1, and reads out the interpolation pixel block to transfer it to the pixel interpolation section 14h if it exists, or reads out the cache block corresponding to the lower adjoining block from the frame buffer 13 and overwrites the cache block which is farthest from obtained cache block in the second direction in the pre-correction image with the cache block thus read out if it does not exist. It should be noted that this process will be described later in detail with reference to FIG. 21.

In the step S43, whether or not the process to the lower right adjoining block is necessary is determined, and if it is determined that the process is necessary, the process proceeds to the step S44, and in the other cases, the process returns to the original process. Specifically, in the case shown in FIG. 19D, since the process to the lower right adjoining block becomes necessary, the process proceeds to the step S44, and in the other cases, the process returns to the original process.

In the step S44, the control section 14b2 executes a "lower right adjoining block process" as the process with respect to the lower right adjoining block. In more detail, the control section 14b2 determines whether or not the lower right adjoining block exists in the SRAM 14b1, and reads out the interpolation pixel block to transfer it to the pixel interpolation section 14h if it exists, or reads out the cache block corresponding to the lower right adjoining block from the frame buffer 13 and overwrites the cache block which is farthest from obtained cache block in the second direction in the pre-correction image with the cache block thus read out if it does not exist. It should be noted that this process will be described later in detail with reference to FIG. 21.

According to the process described above, the post-correction coordinate supplied from the control section 14e is converted into the pre-correction coordinate, and the cache block to be required is specified based on the pre-correction coordinate. Further, if the cache block thus specified exists in the SRAM 14b1, the interpolation pixel block is read out and then transferred to the pixel interpolation section 14h, and if it does not exist, the cache block is read out from the frame buffer 13, and overwrites the predetermined cache block of the SRAM 14b1.

Figure 20:
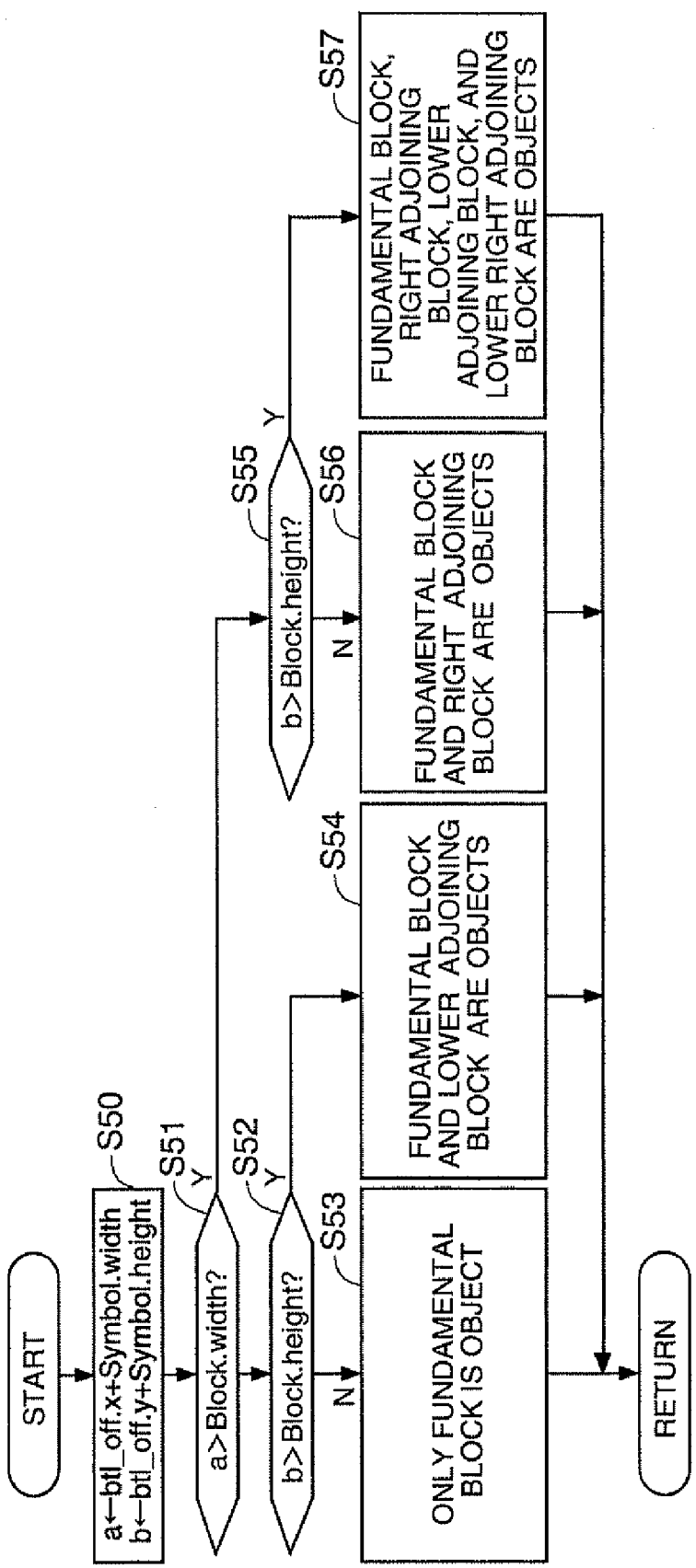
FIG. 20 is a flowchart for explaining details of the step S37 shown in FIG. 18.

Then, details of the process shown in the step S37 of FIG. 18 will be explained with reference to FIG. 20. When the process shown in FIG. 20 is started, the following steps are executed.

Firstly, in the step S50, the value, which is obtained by adding Symbol.width (=4) as the width of the interpolation pixel block to the offset coordinate btl_off.x in the x direction of the interpolation pixel block obtained in the step S35 of FIG. 18, is assigned to the variable a, and at the same time, the value, which is obtained by adding Symbol.height (=4) as the height of the interpolation pixel block to the offset coordinate btl_off.y in the y direction of the interpolation pixel block, is assigned to the variable b.

In the step S51, the control section 14b2 compares the value stored in the variable a with the Block.width representing the width of the cache block to determine whether or not a>Block.width is true, and if it is true (Yes in the step S51), the process proceeds to the step S55, and in the other cases (No in the step S51), the process proceeds to the step S52. Specifically, if the value obtained by adding the Symbol.width as the width of the interpolation pixel block to btl_off.x as the offset value in the x direction of the interpolation pixel block is larger than the Block.width as the width of the cache block, the interpolation pixel block is in a condition of running off the right side of the cache block, and in that case, the process proceeds to the step S55.

In the step S52, the control section 14b2 compares the value stored in the variable b with the Block.height representing the height of the cache block to determine whether or not b>Block.height is true, and if it is true (Yes in the step S52), the process proceeds to the step S54, and in the other cases (No in the step S52), the process proceeds to the step S53. Specifically, if the value obtained by adding the Symbol.height as the height of the interpolation pixel block to btl_off.y as the offset value in the y direction of the interpolation pixel block is larger than the Block.height as the height of the cache block, the interpolation pixel block is in a condition of running off the lower side of the cache block, and in that case, the process proceeds to the step S54.

In the step S53, since the interpolation pixel block is in a condition (the condition shown in FIG. 19A) of fitting in the cache block, it is determined that only the fundamental block is the object of the processing, and the process returns to the original process.

In the step S54, since the interpolation pixel block is in a condition (the condition shown in FIG. 19C) of running off the lower side of the cache block, it is determined that the fundamental block and the lower adjoining block are the objects of the processing, and the process returns to the original process.

In the step S55, the control section 14b2 compares the value stored in the variable b with the Block.height representing the height of the cache block to determine whether or not b>Block.height is true, and if it is true (Yes in the step S55), the process proceeds to the step S57, and in the other cases (No in the step S55), the process proceeds to the step S56. It should be noted that in the case in which it is determined Yes in the step S55, since it is the case in which it has already been determined Yes in the step S51, the interpolation pixel block is in the condition of running off the lower right side of the fundamental block.

In the step S56, since the interpolation pixel block is in a condition (the condition shown in FIG. 19B) of running off the right side of the cache block, it is determined that the fundamental block and the right adjoining block are the objects of the processing, and the process returns to the original process.

In the step S57, since the interpolation pixel block is in a condition (the condition shown in FIG. 19D) of running off the lower right side of the cache block, it is determined that the fundamental block, the right adjoining block, the lower adjoining block, and the lower right adjoining block are the objects of the processing, and the process returns to the original process.

According to the process described above, the relationship between the interpolation pixel block and the cache block is specified.

Figure 21:
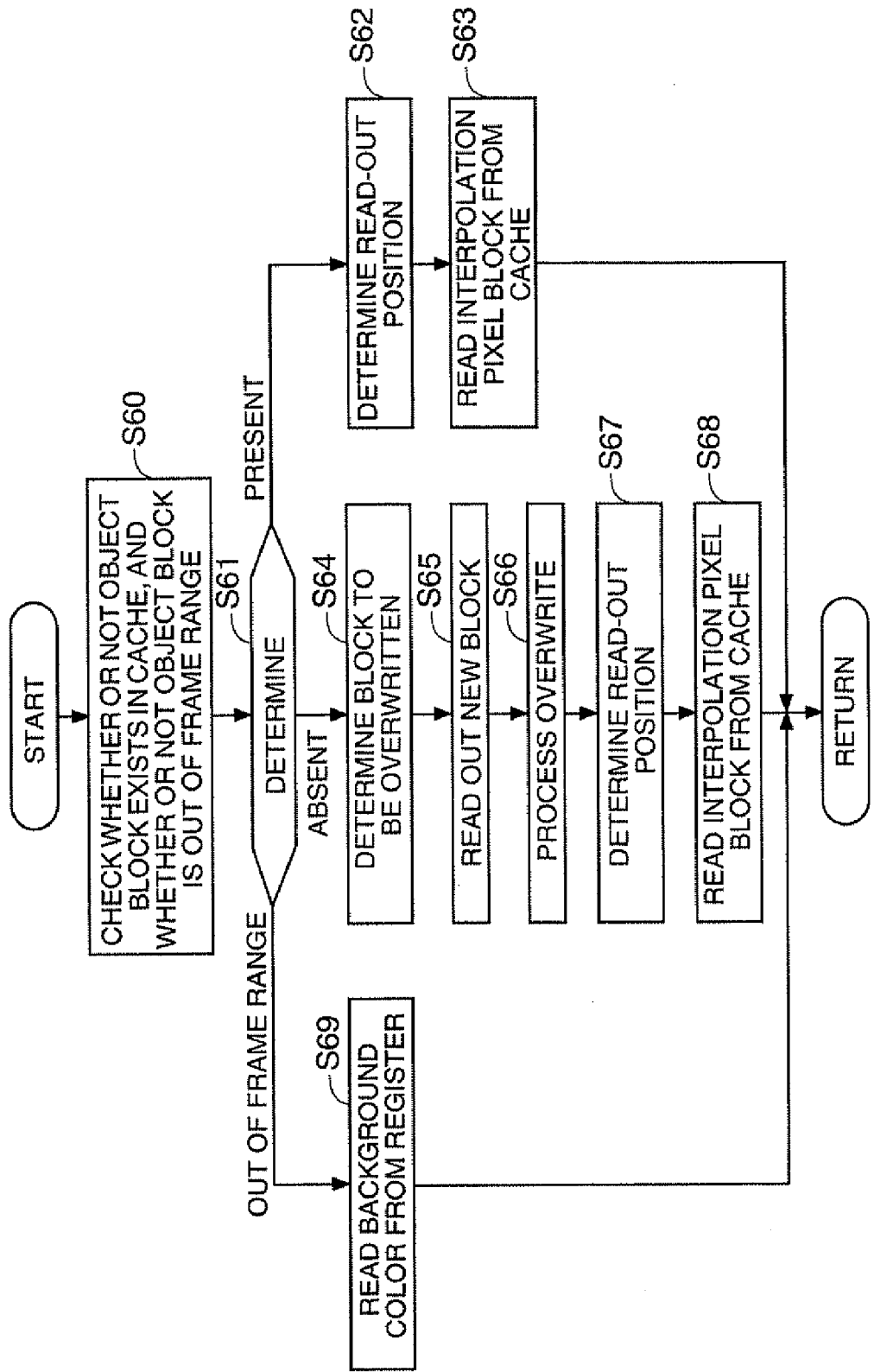
FIG. 21 is a flowchart for explaining details of the step S38 and so on shown in FIG. 18.

Then, details of the process shown in the steps S38, S40, S42, and S44 of FIG. 18 will be explained with reference to FIG. 21. When the process shown in FIG. 21 is started, the following steps are executed.

Figure 22:
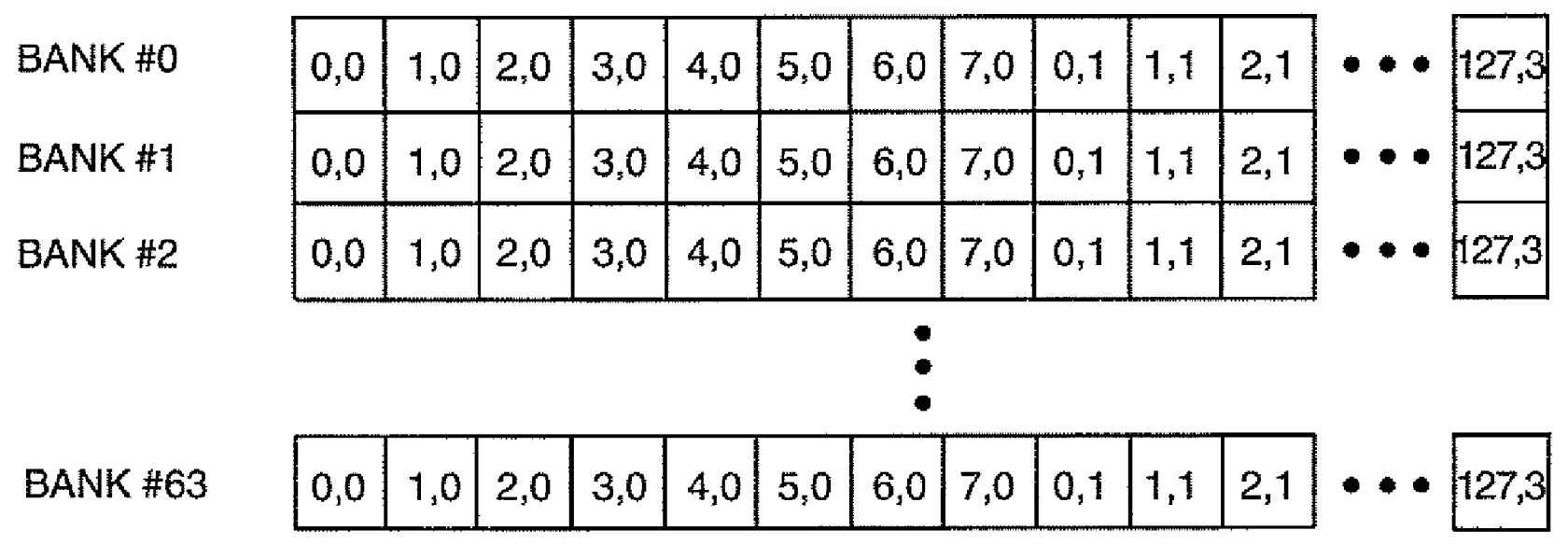

Specifically, in the step S60, the control section 14b2 checks whether or not the object block exists in the SRAM 14b1 and whether or not the object block is out of the frame range. FIG. 22 is a diagram showing a detailed configuration example of the SRAM 14b1. As shown in the drawing, the SRAM 14b1 has 64 banks #0 through #63 corresponding respectively to the 64 pixels of the cache block shown in FIG.

11. In the example shown in FIG. 22, there is shown the condition in which the 512 cache blocks of (0,0) through (127,3) as the initial blocks are stored as shown in FIG. 12. For example, with respect to the cache block (0,0), the pixel of "0" shown in FIG. 11 is stored in the bank #0, the pixel of "1" is stored in the bank #1, . . . , the pixel of "63" is stored in the bank #63. It should be noted that the control section 14b2 manages which cache block is stored in what number of the SRAM 14b1 using, for example, a table. As a result, in the process of the step S60, in the case in which the block to be the object is, for example, the cache block of (0,0), the control section 14b2 looks up the table to check whether or not the cache block of (0,0) exists in the SRAM 14b1. By thus storing the pixels of the cache block separately in the banks different from each other, the access rate can be increased. In other words, in general, the time necessary for bank-switching of the SRAM is dramatically shorter than the time necessary for switching the RAS address. Therefore, by composing the SRAM of a plurality of banks and arranging to store the data corresponding to one cache block so as to straddle the banks, as is the case with the present modified example, it becomes possible to make the data transfer dramatically efficient compared to the case of reading the block data while switching the RAS address from a continuous address space. For example, assuming that the access time per clock is 7.5 ns, the time for reading one frame with the resolution (1024×768) of the XGA becomes 5.9 ms according to the following formula 7, which makes it possible to read the pixels corresponding to one frame in a shorter time of 35% of the one frame display time (1/60 second).

$$(1024/4) \times (768/4) \times 7.5 \text{ ns} \times 16 \text{clk} = 5.9 \text{ ms} \quad (7)$$

Further, the control section 14b2 checks whether or not the interpolation pixel block is out of the range of the frame (pre-correction image) based on the iptl.x, iptl.y obtained in the step S33. It should be noted that if it is out of the range, since there is no pixel to be the object of the interpolation process, in that case, the process proceeds to the step S69 in accordance with the determination in the step S61, and the background color is used as the object pixel of the process.

In the step S61, whether or not the object block exists in the SRAM 14b1 and whether or not the object block is out of the range of the frame are determined based on the result of the checking in the step S60. As a result, if it is determined that the object block exists in the SRAM 14b1, the process proceeds to the step S62. Further, if it is determined that the object block does not exist, the process proceeds to the step S64. Still further, if it is determined that the object block is out of the frame range, the process proceeds to the step S69.

In the step S62, the control section 14b2 specifies the read out location of the SRAM 14b1. Specifically, the control section 14b2 specifies the location in the SRAM 14b1 where the cache block to be the object is stored, and specifies the banks corresponding to the interpolation pixel block. For example, assuming that the object block is (0,0), and the interpolation pixel block includes the pixels of 10 through 13, 18 through 21, 26 through 29, and 34 through 37 in the cache block as shown in FIG. 11, the pixels belonging to the leftmost column shown in FIG. 22, and included in the banks #10 through #13, #18 through #21, #26 through #29, and #34 through #37 are specified as the read out objects.

In the step S63, the control section 14b2 reads out the pixels specified in the step S62 from the SRAM 14b1, and transfers them to the pixel interpolation section 14h. As a result, the pixel interpolation section 14h executes the interpolation process based on the interpolation pixel block and the parameters stored in the register section 14g, and the pixels thus obtained are transferred to the frame buffer 13 via the double buffer section 14i, and stored in the frame buffer 13 as the post-correction image. Then, the process returns to the original process. It should be noted that it is also possible that the output data from the double buffer section 14i is transferred directly to the liquid crystal driver 20 instead of storing the output data in the frame buffer 13.

If it is determined in the step S61 that the object block does not exist in the SRAM 14b1, the process proceeds to the step S64, and the control section 14b2 determines the cache block to be overwritten in the SRAM 14b1. For example, in the case shown in FIG. 13, if the block (0,4) is the object block, the cache block of (0,0) which is farthest from obtained cache block (0,4) in the second direction in the pre-correction image is determined as the block to be overwritten.

In the step S65, the control section 14b2 reads out the object block from the frame buffer 13 as a new block. On this occasion, as explained with reference to FIGS. 16, and 17, since the cache block stored in the frame buffer 13 is stored in the area with contiguous addresses, the control section 14b2 can obtain the cache block with a single to the frame buffer 13.

In the step S66, the block to be overwritten obtained in the step S64 is overwritten with the cache block obtained in the step S65. In the example described above, since the object block is the block (0,4), and the block to be overwritten is the block (0,0), the leftmost column shown in FIG. 22 is overwritten with the cache block read out in the step S65. It should be noted that also when writing the block, the data can be written at a higher speed compared to the case of providing the RAS signal as described above.

In the step S67, the control section 14b2 specifies the read out location of the SRAM 14b1. Specifically, the control section 14b2 specifies the banks corresponding to the interpolation pixel block in the SRAM 14b1. For example, assuming that the object block is (0,4), and the interpolation pixel block includes the pixels of 10 through 13, 18 through 21, 26 through 29, and 34 through 37 in the cache block as shown in FIG. 11, the pixels belonging to the leftmost column shown in FIG. 22, and included in the banks #10 through #13, #18 through #21, #26 through #29, and #34 through #37 are specified as the read out objects.

In the step S68, the control section 14b2 reads out the pixels specified in the step S67 from the SRAM 14b1, and transfers them to the pixel interpolation section 14h. As a result, the pixel interpolation section 14h executes the interpolation process based on the interpolation pixel block and the parameters stored in the register section 14g, and the pixels thus obtained are transferred to the frame buffer 13 via the double buffer section 14i, and stored in the frame buffer 13 as the post-correction image. Then, the process returns to the original process.

In the step S69, the control section 14b2 obtains the background color from the register section 14g. For example, in the case in which the background color is blue, the value corresponding to blue is obtained from the register section 14g. Further, the background color thus obtained is transferred to the pixel interpolation section 14h. The pixel interpolation section 14h executes the interpolation process based on the background color and the parameters stored in the register section 14g, and the pixels thus obtained are transferred to the frame buffer 13 via the double buffer section 14i, and stored in the frame buffer 13 as the post-correction image. Then, the process returns to the original process.

According to the process described above, whether or not the object block exists in the SRAM 14b1 is determined, and if it exists, the interpolation pixel block is read out to be transferred to the pixel interpolation section 14h, and the interpolation process is executed. Further, if the object block does not exist, the object block is read out from the frame buffer 13 and stored in the SRAM 14b1. Still further, if the object block belongs to an area outside the range of the frame, the background color is obtained from the register section 14g to be transferred to the pixel interpolation section 14h, and the interpolation process is executed.

As explained hereinabove, in the embodiment of the invention, it is arranged that when the keystone distortion correction process is started, the initial block is stored in the SRAM 14b1 as shown in FIG. 12, and as the process progresses, the cache block existing at the same line position in the pre-correction image and at the position the farthest from the object block is overwritten with the object block as shown in FIG. 13. Thus, it is possible to execute the correction process without increasing the capacity of the SRAM 14b1. It should be noted that by using the method of the present embodiment, it is known by calculation that a hit rate of the cache of about 97% can be realized even in the case in which the pre-correction image with a resolution of XGA is turned 45 degrees in the vertical direction and 45 degrees in the lateral direction. As described above, according to the present embodiment, it becomes possible to reduce the capacity of the SRAM 14b1 while keeping the hit rate in the high level irrespective of the angle of the correction.

Further, in the present embodiment, it is arranged that the format conversion shown in FIGS. 16 and 17 is executed when storing the pre-correction image in the frame buffer 13. As a result, since it becomes possible to read out the pre-correction image at a high rate from the frame buffer 13, which is composed of the DRAM or the like having a lower operation rate than the SRAM 14b1, the object block can be read out and stored in the SRAM 14b1 in a short period of time even in the case in which miss cache occurs, and therefore, it is possible to reduce the wait time in case of miss cache, and to increase the processing rate of the keystone distortion correction process.

Further, in the present embodiment, as shown in FIG. 22, it is arranged that the SRAM 14b1 is provided with a corresponding number of banks to the number of pixels constituting the cache block, and the pixels are separately stored in the respective banks. Therefore, it becomes possible to read out the interpolation pixel block from the SRAM 14b1 at a high rate.

Further, in the present embodiment, since it is arranged that the double buffer is provided to the output of the pixel interpolation section 14h as shown in FIG. 2 and the block transfer of the image obtained by the interpolation process by the pixel interpolation section 14h is executed in a lump while alternately storing the image in the buffers, the transfer of the image from the pixel interpolation section 14h to the frame buffer can be executed at a high rate.

D. Modified Embodiments

Although the invention is explained hereinabove based on the embodiment, the invention is not limited to the embodiment. For example, although in the embodiment described above the explanation is presented exemplifying the image with the resolution of XGA as the image to be the object of the keystone distortion correction process, it is obvious that the image with other resolutions than this resolution can be adopted.

Further, although in the embodiment described above, the explanation is presented exemplifying the 8×8 pixels as the cache block and exemplifying the 4×4 pixels as the interpolation pixel block, a different number of pixels from these numbers can also be adopted. For example, it is also possible to use the cache block with 16×16 pixels, and the interpolation pixel block with 8×8 pixels. It is obvious that another number of pixels than the above can also be adopted.

Further, although in the embodiment described above it is arranged that the SRAM 14b1 stores 512 (corresponding to 32 lines) cache blocks as shown in FIG. 12, a different number of cache blocks from the above number can also be adopted. For example, it is also possible to arrange that the SRAM 14b1 stores two cache blocks (totally 256 blocks), three cache blocks (totally 384 blocks), five blocks (totally 640 blocks), or more in the vertical direction. It should be noted that since there can be the case in which the interpolation pixel block exists straddling the two blocks vertically adjacent to each other as shown in FIG. 19, the SRAM 14b1 needs to store at least two blocks in the vertical direction.

Further, although in the embodiment described above, as shown in FIG. 12, the blocks (0,0) through (127,3) are read as the initial blocks, it is also possible to read out other blocks as the initial blocks. For example, in the case in which the angle of read is known previously, it is also possible to read out the cache block group corresponding to that angle. Further, it is also possible to arrange that the initial blocks are stored with respect to a part of capacity of the SRAM 14b1.

Further, although in the embodiment described above, it is arranged that the SRAM 14b1 is provided with the 64 banks as shown in FIG. 22, it is also possible to arrange that the cache block is divided into a plurality of sub-blocks, a corresponding number of banks to the number of sub-blocks are provided, and the pixels are read out while the banks are switched for every sub-block. For example, it is also possible to arrange that the cache block is divided into four parts to form four sub-blocks each composed of 4×4 pixels, and at the same time, the SRAM 14b1 is provided with 16 banks, and the 16 pixels constituting each of the sub-blocks are stored in the respective banks.

It should be noted that although in the present embodiment the case in which the maximum pixel area 22A of the liquid crystal panel 22 has a horizontally long rectangular shape is explained, any shape can be adopted as the shape of the maximum pixel area 22A, and a vertically long rectangular shape can also be adopted in order for providing freedom to the location of the image forming area 22B in the vertical direction. Further, although in the embodiment described above, the configuration in which the optical axis 10L of the projector 10 and the center of the maximum pixel area 22A match with each other is illustrated and explained, it is also possible to adopt a configuration capable of moving the maximum pixel area 22A relatively to the optical axis 10L.

Further, although in the description of the embodiment the case in which the pixels are arranged in the liquid crystal panel 22 in a matrix is explained, a configuration having the pixels arranged to form a honeycomb structure can also be adopted. Further, although in the above description of the embodiment, the configuration of using the liquid crystal panel 22 equipped with the transmissive liquid crystal display panel is explained, the invention is not limited thereto, but a reflective liquid crystal display panel, for example, can be used as the liquid crystal panel 22, or a digital mirror device (DMD (a registered trademark)) or the like can also be used instead of the liquid crystal panel 22. The pixel arrangement of the reflective liquid crystal panel and the digital mirror device can be a matrix or a honeycomb structure.

In addition, although in the above description of the embodiment the example of projecting the image towards the screen 4 implemented outside the projector 10 is explained, a configuration of projecting the image to, for example, so-called as a rear-projection display device, the transmissive screen 4 implemented integrally in the housing of the projector 10 can also be adopted. Further, the projector 10 can be applied to an electronic apparatus provided with the function of projecting the image besides the rear-projection display device. Further, it is obvious that a configuration of housing the image supply device 2 and the projector 10 integrally in the same housing can be adopted.

Further, although in the explanation described hereinabove the case in which the control program for realizing the function of the projector 10 is stored in the storage section not shown is described, it is possible to record the control program on a semiconductor recording medium such as a RAM or a ROM, a magnetic storage recording medium such as an FD or an HD, an optical read-out recording medium such as a CD, a CDV, an LD, or a DVD, or a magnetic recording/optical read-out recording medium such as an MO, and any type of recording medium can be adopted irrespective of the read-out method such as electronic type, magnetic type or optical type, providing the recording medium is computer-readable. Further, there can also be adopted a configuration of realizing the function described above by reading out and executing the control program recorded on such a recording medium by the MPU 15, or by further providing a network interface as a communication interface in the projector 10 and downloading the control program by the network interface via the network to execute the control program. Further, it is also possible to adopt a configuration of providing the network interface in the image supply device 2, and downloading the image data by the network interface via the network to output the image data to the projector 10, and it is obvious that other specific configurations can arbitrarily be modified within the range in which the scope of the invention is not diminished.

The entire disclosure of Japanese Patent Application No. 2008-068960, filed Mar. 18, 2008 is expressly incorporated by reference herein.

What is claimed is:

1. A projector configured to correct a keystone distortion of an image, and to display a post-correction image, the projector comprising:
    a frame memory configured to store a pre-correction image;
    an image composition circuit configured to: i) execute reordering so that pixel data constituting each cache block is stored in an area with contiguous addresses, and ii) store an image obtained by the reordering in the frame memory as the pre-correction image;
    a block data storage memory configured to store the pre-correction image by block data comprising M pixels in a first direction and N pixels in a second direction (M, N≧2), and provided with a capacity capable of storing n×N (n≧2) lines of the pre-correction image;
    a correction section configured to correct the pre-correction image based on the block data stored in the block data storage memory; and
    a control section configured to obtain the pre-correction image from the frame memory by the block data, and also configured to store the obtained pre-correction image in the block data storage memory, wherein
        the control section obtains contiguous n×N (n≧2) lines of the image from the frame memory and stores the obtained image in the block data storage memory at the beginning of the correction process, and in a subsequent process, if the block data to be the object of the processing is absent from the block data storage memory, obtains the block data from the frame memory, and overwrites block data which is farthest from obtained block data in the second direction in the pre-correction image with the obtained block data.

2. The projector according to claim 1, wherein the pre-correction image stored in the frame memory is converted in format so that the pixels forming the block data are stored in contiguous addresses.

3. The projector according to claim 1, wherein the block data storage memory stores the pixels forming the block data in different banks.

4. The projector according to claim 1, further comprising: an output section configured to store a predetermined amount of the post-correction image corrected by the correction section, and then output in a lump.

5. An electronic apparatus comprising:
    a frame memory configured to store a pre-correction image;
    an image composition circuit configured to: i) execute reordering so that pixel data constituting each cache block is stored in an area with contiguous addresses, and ii) store an image obtained by the reordering in the frame memory as the pre-correction image;
    a block data storage memory configured to store the pre-correction image by block data comprising M pixels in a first direction and N pixels in a second direction (M, N≧2), and provided with a capacity capable of storing n×N (n≧2) lines of the pre-correction image;
    a correction section configured to correct the pre-correction image based on the block data stored in the block data storage memory; and
    a control section configured to perform control of obtaining the pre-correction image from the frame memory by the block data, and storing the obtained pre-correction image in the block data storage memory, wherein the control section obtains contiguous n×N (n≧2) lines of the image from the frame memory and stores the obtained image in the block data storage memory at the beginning of the correction process, and in a subsequent process, if the block data to be the object of the processing is absent from the block data storage memory, obtains the block data from the frame memory, and overwrites block data which is farthest from obtained block data in the second direction in the pre-correction image with the obtained block data.

6. A method of controlling a projector configured to correct a keystone distortion of an image, and to display a post-correction image, the method comprising:
    reordering pixel data constituting each cache block in an area with contiguous addresses to obtain a pre-correction image;
    storing the pre-correction image in a frame memory;
    obtaining contiguous n×N (n≧2) lines of the pre-correction image from the frame memory by a block data comprising M pixels in a first direction and N pixels in a second direction (M, N≧2);
    storing the obtained image in a block data storage memory at the beginning of the correction process;
    correcting the pre-correction image based on the block data stored in the block data storage memory; and
    obtaining the block data from the frame memory if the block data to be the object of the processing is absent from the block data storage memory, and overwriting block data which is farthest from obtained block data in the second direction in the pre-correction image with the obtained block data.

* * * * *